United States Patent
Wang

(10) Patent No.: US 12,450,714 B2
(45) Date of Patent: Oct. 21, 2025

(54) BATTERY CELL ELECTRODE PLATE DETECTION METHOD AND APPARATUS, AND ELECTRONIC DEVICE

(71) Applicant: CONTEMPORARY AMPEREX TECHNOLOGY (HONG KONG) LIMITED, Hong Kong (CN)

(72) Inventor: Zhihong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 328 days.

(21) Appl. No.: 18/344,124

(22) Filed: Jun. 29, 2023

(65) Prior Publication Data

US 2024/0177287 A1    May 30, 2024

Related U.S. Application Data

(63) Continuation of application No. PCT/CN2023/082429, filed on Mar. 20, 2023.

(30) Foreign Application Priority Data

Nov. 30, 2022    (CN) .......................... 202211516676.7

(51) Int. Cl.
*G06T 7/00* (2017.01)
*G06T 7/11* (2017.01)
(Continued)

(52) U.S. Cl.
CPC .............. *G06T 7/0004* (2013.01); *G06T 7/11* (2017.01); *G06T 7/73* (2017.01);
(Continued)

(58) Field of Classification Search
CPC . G06T 7/0004; G06T 7/11; G06T 7/73; G06T 2207/10116; G06T 2207/20081;
(Continued)

(56) References Cited

U.S. PATENT DOCUMENTS 10,579,892 B1 *   3/2020  Wilbert .................. G06Q 40/03
11,790,497 B2 * 10/2023  Wang ........................ G06T 5/94
                                                           382/100
(Continued)

FOREIGN PATENT DOCUMENTS

CN    112330623 A    2/2021
CN    112465814 A    3/2021
(Continued)

OTHER PUBLICATIONS

EP Decision to grant a Patent for copending application 23734130.0 dated Jul. 3, 2025.
(Continued)

*Primary Examiner* — Bobbak Safaipour
(74) *Attorney, Agent, or Firm* — Ladas & Parry LLP

(57) ABSTRACT

This disclosure relates to the field of battery technologies, and provides a battery cell electrode plate detection method and apparatus, and an electronic device. The method includes: performing feature extraction on a to-be-detected battery cell electrode plate image to obtain an electrode plate feature, where the electrode plate feature includes a channel attention feature embedded with position information; performing electrode plate detection based on the electrode plate feature to obtain an electrode plate detection result; and determining an amount of misalignment between an anode plate and a cathode plate based on position information of the anode plate and the cathode plate in the electrode plate detection result. According to the technical solution provided in this application, the amount of misalignment between the cathode plate and the anode plate can be detected.

12 Claims, 10 Drawing Sheets

(51) Int. Cl.
*G06T 7/73* (2017.01)
*H01M 10/42* (2006.01)

(52) U.S. Cl.
CPC ............... *H01M 10/4285* (2013.01); *G06T 2207/10116* (2013.01); *G06T 2207/20081* (2013.01); *G06T 2207/20221* (2013.01)

(58) Field of Classification Search
CPC ........... G06T 2207/20221; G06T 2207/20084; H01M 10/4285; Y02E 60/10; G06N 3/082; G06V 10/44; G06V 10/774; G06V 10/806; G06V 10/82
See application file for complete search history.

(56) References Cited

U.S. PATENT DOCUMENTS

| | | | | |
|---|---|---|---|---|
| 2019/0198882 A1* | 6/2019 | Jeong | ............... | H01M 50/538 |
| 2019/0251369 A1* | 8/2019 | Popov | ............... | G06V 20/54 |
| 2019/0341658 A1* | 11/2019 | Han | ............... | H01M 10/052 |
| 2025/0161667 A1* | 5/2025 | Bikson | ............... | A61N 1/20 |

FOREIGN PATENT DOCUMENTS

| | | |
|---|---|---|
| CN | 114049313 A | 2/2022 |
| CN | 114581446 A | 6/2022 |
| CN | 114663346 A | 6/2022 |
| CN | 115205247 A | 10/2022 |
| WO | 201248554 A1 | 12/2021 |

OTHER PUBLICATIONS

International Search Report, dated Jun. 23, 2023, corresponding to International Application No. PCT/CN2023/082429.
European Search Report, dated Jul. 29, 2024, corresponding to EPO Application No. 23734130.0.
Hou, Qibin et al: "Coordinate Attention for Efficient Mobile Network Design", 2021 IEEE/CVF Conference on Computer Vision and Pattern Recognition (CVPR), IEEE, Jun. 20, 2021 (Jun. 20, 2021), pp. 13708-13717, XP034008013.
Xie, Fang et al: "Research on the Coordinate Attention Mechanism Fuse in a YOLOv5 Deep Learning Detector for the SAR Ship Detection Task", Sensors, (Online), vol. 22, No. 9, Apr. 28, 2022 (Apr. 28, 2022), 3370, pp. 1-16, XP093182334.

* cited by examiner

BATTERY CELL ELECTRODE PLATE DETECTION METHOD AND APPARATUS, AND ELECTRONIC DEVICE

CROSS-REFERENCE TO RELATED APPLICATIONS

This application is a continuation of International application PCT/CN2023/082429 filed on Mar. 20, 2023 that claims priority to Chinese Patent Application No. 202211516676.7 filed on Nov. 30, 2022, which is incorporated herein by reference in its entirety.

TECHNICAL FIELD

This application relates to the field of battery technologies, and in particular, to a battery cell electrode plate detection method and apparatus, and an electronic device.

BACKGROUND

Lithium batteries have advantages of high energy density, light weight, long service life, good performance, and no pollution, and have been widely applied in various fields such as energy storage, electric vehicles, aerospace, and intelligent electronic devices.

A battery cell is one of important structures in a lithium battery. The battery cell is mainly formed by winding or stacking an anode plate and a cathode plate. The anode plate and the cathode plate are separated by a separator. In a charging process, lithium ions are released from a positive electrode plate (that is, the cathode plate) and intercalated into a negative electrode plate (that is, the anode plate). If the negative electrode plate does not have a position to receive the lithium ions, the lithium ions are precipitated on a surface of the negative electrode plate, and this phenomenon is referred to as lithium precipitation. Lithium precipitation affects a battery capacity and in severe cases, leads to lithium crystals that will penetrate the separator, and such penetration causes a battery short circuit, explosion, or other major safety incidents. To reduce lithium precipitation at an anode and improve safety of the battery, in a design of the lithium battery, an overhang region (a part of the anode plate beyond the cathode plate in length and width directions) is usually designed, that is, an edge of the anode plate and an edge of the cathode plate are not aligned, but there is an amount of misalignment. If the amount of misalignment of the anode plate relative to the cathode plate is excessively small, the foregoing lithium precipitation problem is likely to occur. Therefore, it is necessary to detect the amount of misalignment during production inspection of lithium batteries.

SUMMARY

In view of this, this application provides a battery cell electrode plate detection method and apparatus, and an electronic device to detect an amount of misalignment between a cathode plate and an anode plate.

To achieve the foregoing objective, according to a first aspect, an embodiment of this application provides a battery cell electrode plate detection method, including:

performing feature extraction on a to-be-detected battery cell electrode plate image to obtain an electrode plate feature, where the electrode plate feature includes a channel attention feature embedded with position information;

performing electrode plate detection based on the electrode plate feature to obtain an electrode plate detection result, where the electrode plate detection result includes position information of an anode plate and a cathode plate; and determining an amount of misalignment between the anode plate and the cathode plate based on the position information of the anode plate and the cathode plate in the electrode plate detection result.

According to the battery cell electrode plate detection method provided in this embodiment of this application, feature extraction is performed on the to-be-detected battery cell electrode plate image, then electrode plate detection is performed based on the extracted electrode plate feature, and then the amount of misalignment between the anode plate and the cathode plate is determined based on the position information of the anode plate and the cathode plate in the electrode plate detection result. In this way, the amount of misalignment between the anode plate and the cathode plate can be detected. The feature extraction process can extract an effective feature, thereby improving accuracy of the electrode plate detection result and further improving accuracy of an amount-of-misalignment detection result. In addition, the feature extraction process can reduce data dimensionality, and therefore can also improve detection efficiency. Because an attention mechanism is added to the feature extraction process to extract the channel attention feature including the embedded position information, the position information of the electrode plates and a feature channel relationship in the battery cell electrode plate image can be captured. This can effectively improve effectiveness of the extracted feature, further improve accuracy of the electrode plate detection result, and further improve accuracy of the amount-of-misalignment detection result.

In a possible implementation of the first aspect, the performing feature extraction on a to-be-detected battery cell electrode plate image to obtain an electrode plate feature includes:

performing a plurality of convolution operations and at least one attention operation on the to-be-detected battery cell electrode plate image to obtain a first feature;

performing multi-scale feature fusion on the first feature to obtain a second feature; and performing feature fusion from deep to shallow and then from shallow to deep on the second feature to obtain the electrode plate feature.

In the foregoing implementation, in the process of obtaining the electrode plate feature, first, the plurality of convolution operations and at least one attention operation are performed to extract the first feature, then multi-scale fusion is performed on the first feature to obtain the second feature, and then feature fusion is further performed on the second feature. In this way, a richer feature can be extracted, and accuracy of the electrode plate detection result can be effectively improved. In addition, because the attention operation is used before feature fusion, a feature extraction effect at an early feature extraction stage can be improved, and further, better results can be obtained in subsequent feature fusion and target prediction.

In a possible implementation of the first aspect, the performing a plurality of convolution operations and at least one attention operation on the to-be-detected battery cell electrode plate image to obtain a first feature includes:

performing a slicing operation and then a convolution operation on the to-be-detected battery cell electrode plate image to obtain an initial feature;

performing a plurality of convolution, batch normalization, activation, and cross-stage partial fusion operations on the initial feature to obtain a target partial feature;

and performing an attention operation on the target partial feature to obtain the first feature.

In the foregoing implementation, the slicing operation, followed by the convolution operation, may be performed on the battery cell electrode plate image to improve a receptive field of each extracted feature point, while reducing an amount of calculation and increasing a speed of feature extraction; and the plurality of convolution, batch normalization, activation, and cross-stage partial fusion operations may be performed on the initial feature to effectively extract a partial feature in a feature map, optimize gradient information in a backbone network, effectively enhance a learning capability of the network, and improve accuracy of the detection result while reducing the amount of calculation and memory costs.

In a possible implementation of the first aspect, the performing a plurality of convolution, batch normalization, activation, and cross-stage partial fusion operations on the initial feature to obtain a target partial feature includes:

performing convolution, batch normalization, and activation processing on the initial feature to obtain a first convolutional feature;

performing a cross-stage partial fusion operation on the first convolutional feature to obtain a first partially fused feature;

performing an attention operation on the first partially fused feature to obtain a first attention-fused feature;

performing convolution, batch normalization, and activation processing on the first attention-fused feature to obtain a second convolutional feature;

performing a cross-stage partial fusion operation on the second convolutional feature to obtain a second partially fused feature;

performing an attention operation on the second partially fused feature to obtain a second attention-fused feature;

performing convolution, batch normalization, and activation processing on the second attention-fused feature to obtain a third convolutional feature; and performing a cross-stage partial fusion operation on the third convolutional feature to obtain a target partially fused feature.

In the foregoing implementation, in the process of obtaining the target partially fused feature, the foregoing two attention operations may be performed to further improve the feature extraction effect.

In a possible implementation of the first aspect, the performing feature fusion from deep to shallow and then from shallow to deep on the second feature to obtain the electrode plate feature includes:

performing convolution and upsampling processing on the second feature, followed by feature fusion with the first feature, to obtain an intermediate fused feature;

performing convolution and upsampling processing on the intermediate fused feature, followed by feature fusion with the second attention-fused feature, to generate a first-scale electrode plate feature;

performing feature fusion based on the first-scale electrode plate feature and the intermediate fused feature to generate a second-scale electrode plate feature; and performing feature fusion based on the second-scale electrode plate feature and the second feature to generate a third-scale electrode plate feature.

In the foregoing implementation, the feature fusion effect can be improved and a better electrode plate feature can be obtained.

In a possible implementation of the first aspect, the attention operation includes:

obtaining an attention weight in a width direction and an attention weight in a height direction of an input feature map; and performing multiplicative weighting calculation based on the obtained attention weights and the feature map to obtain a feature map with the attention weights in the width direction and the height direction.

The foregoing attention operation may be used to capture both the position information and a long range dependency between channels and improve the feature extraction effect.

In a possible implementation of the first aspect, the position information includes coordinates of a central point of a detection box and a width and height of the detection box; and the determining an amount of misalignment between the anode plate and the cathode plate based on the position information of the anode plate and the cathode plate in the electrode plate detection result includes:

determining coordinates of a target vertex of each anode plate based on coordinates of a central point of a detection box of each anode plate and a width and height of the detection box of each anode plate in the electrode plate detection result;

determining coordinates of a target vertex of each cathode plate based on coordinates of a central point of a detection box of each cathode plate and a width and height of the detection box of each cathode plate in the electrode plate detection result; and determining, based on the coordinates of the target vertex of each anode plate and the coordinates of the target vertex of each cathode plate, the amount of misalignment between the anode plate and the cathode plate.

In a possible implementation of the first aspect, the determining, based on the coordinates of the target vertex of each anode plate and the coordinates of the target vertex of each cathode plate, the amount of misalignment between the anode plate and the cathode plate includes:

determining a position relationship between each anode plate and each cathode plate in a horizontal coordinate direction based on a horizontal coordinate of the coordinates of the target vertex of each anode plate and a horizontal coordinate of the coordinates of the target vertex of each cathode plate; and for each cathode plate, determining, based on a vertical coordinate of the coordinates of the target vertex of the cathode plate and vertical coordinates of coordinates of target vertices of two anode plates adjacent to the cathode plate, an amount of misalignment between the cathode plate and each of the two adjacent anode plates.

In the foregoing implementation, efficiency of detecting the amount of misalignment can be improved.

In a possible implementation of the first aspect, the battery cell electrode plate image is obtained by photographing an edge region of a target battery cell, and the amount of misalignment between the anode plate and cathode plate is determined based on electrode plate detection results corresponding to a plurality of battery cell electrode plate images; and the method further includes:

detecting, based on a determined amount of misalignment between an anode plate and a cathode plate, whether the target battery cell is qualified.

In the foregoing implementation, it is possible to detect whether the battery cell is qualified and determine the qualification of the battery cell based on the plurality of battery cell electrode plate images. Therefore, accuracy of the detection result can be improved.

In a possible implementation of the first aspect, the determined amount of misalignment between the anode plate and the cathode plate includes an amount of misalignment between each cathode plate and each of two adjacent anode plates in each electrode plate detection result; and the detecting, based on a determined amount of misalignment between an anode plate and a cathode plate, whether the target battery cell is qualified includes:
if there is an amount of misalignment less than or equal to a first threshold among the determined amounts of misalignment corresponding to each cathode plate, determining that the target battery cell is unqualified.

In the foregoing implementation, it is possible to determine a battery cell in which an amount of misalignment between a cathode plate and an anode plate is excessively small. Therefore, a risk of lithium precipitation in a delivered lithium battery product can be reduced.

In a possible implementation of the first aspect, the method further includes:
if there is an amount of misalignment greater than or equal to a second threshold among the determined amounts of misalignment corresponding to each cathode plate, determining that the target battery cell is unqualified; or
if the determined amounts of misalignment corresponding to each cathode plate are all greater than the first threshold and less than the second threshold, determining that the target battery cell is qualified.

In the foregoing implementation, it is possible to determine a battery cell in which an amount of misalignment between a cathode plate and an anode plate is excessively large, so that energy density of a delivered lithium battery product can be improved; and it is possible to determine a qualified battery cell in which an amount of misalignment meets a requirement.

In a possible implementation of the first aspect, the electrode plate detection result is obtained by using an electrode plate detection model, where the electrode plate detection model is used to perform electrode plate detection based on the obtained electrode plate feature after feature extraction is performed on the battery cell electrode plate image, and output the electrode plate detection result; and
the electrode plate detection model is obtained through training by using the following training method:
performing image preprocessing and data enhancement on a plurality of obtained battery cell electrode plate sample images to obtain a target sample image set, where the target sample image set includes a plurality of target sample images;
labeling the anode plate and the cathode plate in each target sample image to generate label information of each target sample image, where the label information includes types and position information of the electrode plates;
generating a sample data set based on each target sample image and the label information of each target sample image; and
training an initial electrode plate detection model by using the sample data set, to obtain the electrode plate detection model.

In the foregoing implementation, the electrode plate detection model may be trained; and image preprocessing and data enhancement may be performed to improve reliability and richness of training samples and further improve a training effect.

In a possible implementation of the first aspect, the image preprocessing includes filtering and/or contrast enhancement.

In a possible implementation of the first aspect, the data enhancement includes at least one of the following: random flipping, scale variation, image translation, and noise addition.

In a possible implementation of the first aspect, the training an initial electrode plate detection model by using the sample data set, to obtain the electrode plate detection model includes:
dividing the sample data set into a training set, a validation set, and a test set;
training the initial electrode plate detection model by using the training set, and during the training, adjusting hyperparameters by using the validation set, until the model converges or reaches the maximum number of training epochs, to obtain the trained initial electrode plate detection model; and
after performing model evaluation on the trained initial electrode plate detection model by using the test set, generating the electrode plate detection model.

In the foregoing implementation, a model training speed may be effectively increased by using the validation set.

According to a second aspect, an embodiment of this application provides a battery cell electrode plate detection apparatus, including:
a feature extraction module, configured to perform feature extraction on a to-be-detected battery cell electrode plate image to obtain an electrode plate feature, where the electrode plate feature includes a channel attention feature embedded with position information;
a detection module, configured to perform electrode plate detection based on the electrode plate feature to obtain an electrode plate detection result, where the electrode plate detection result includes position information of an anode plate and a cathode plate; and
a determining module, configured to determine an amount of misalignment between the anode plate and the cathode plate based on the position information of the anode plate and the cathode plate in the electrode plate detection result.

In a possible implementation of the second aspect, the performing feature extraction on a to-be-detected battery cell electrode plate image to obtain an electrode plate feature includes:
performing a plurality of convolution operations and at least one attention operation on the to-be-detected battery cell electrode plate image to obtain a first feature;
performing multi-scale feature fusion on the first feature to obtain a second feature; and
performing feature fusion from deep to shallow and then from shallow to deep on the second feature to obtain the electrode plate feature.

In a possible implementation of the second aspect, the performing a plurality of convolution operations and at least one attention operation on the to-be-detected battery cell electrode plate image to obtain a first feature includes:
performing a slicing operation and then a convolution operation on the to-be-detected battery cell electrode plate image to obtain an initial feature;

performing a plurality of convolution, batch normalization, activation, and cross-stage partial fusion operations on the initial feature to obtain a target partial feature; and performing an attention operation on the target partial feature to obtain the first feature.

In a possible implementation of the second aspect, the performing a plurality of convolution, batch normalization, activation, and cross-stage partial fusion operations on the initial feature to obtain a target partial feature includes:

performing convolution, batch normalization, and activation processing on the initial feature to obtain a first convolutional feature;

performing a cross-stage partial fusion operation on the first convolutional feature to obtain a first partially fused feature;

performing an attention operation on the first partially fused feature to obtain a first attention-fused feature;

performing convolution, batch normalization, and activation processing on the first attention-fused feature to obtain a second convolutional feature;

performing a cross-stage partial fusion operation on the second convolutional feature to obtain a second partially fused feature;

performing an attention operation on the second partially fused feature to obtain a second attention-fused feature;

performing convolution, batch normalization, and activation processing on the second attention-fused feature to obtain a third convolutional feature; and performing a cross-stage partial fusion operation on the third convolutional feature to obtain a target partially fused feature.

In a possible implementation of the second aspect, the performing feature fusion from deep to shallow and then from shallow to deep on the second feature to obtain the electrode plate feature includes:

performing convolution and upsampling processing on the second feature, followed by feature fusion with the first feature, to obtain an intermediate fused feature;

performing convolution and upsampling processing on the intermediate fused feature, followed by feature fusion with the second attention-fused feature, to generate a first-scale electrode plate feature;

performing feature fusion based on the first-scale electrode plate feature and the intermediate fused feature to generate a second-scale electrode plate feature; and performing feature fusion based on the second-scale electrode plate feature and the second feature to generate a third-scale electrode plate feature.

In a possible implementation of the second aspect, the attention operation includes:

obtaining an attention weight in a width direction and an attention weight in a height direction of an input feature map; and performing multiplicative weighting calculation based on the obtained attention weights and the feature map to obtain a feature map with the attention weights in the width direction and the height direction.

In a possible implementation of the second aspect, the position information includes coordinates of a central point of a detection box and a width and height of the detection box; and the determining an amount of misalignment between the anode plate and the cathode plate based on the position information of the anode plate and the cathode plate in the electrode plate detection result includes:

determining coordinates of a target vertex of each anode plate based on coordinates of a central point of a detection box of each anode plate and a width and height of the detection box of each anode plate in the electrode plate detection result;

determining coordinates of a target vertex of each cathode plate based on coordinates of a central point of a detection box of each cathode plate and a width and height of the detection box of each cathode plate in the electrode plate detection result; and determining, based on the coordinates of the target vertex of each anode plate and the coordinates of the target vertex of each cathode plate, the amount of misalignment between the anode plate and the cathode plate.

In a possible implementation of the second aspect, the determining, based on the coordinates of the target vertex of each anode plate and the coordinates of the target vertex of each cathode plate, the amount of misalignment between the anode plate and the cathode plate includes:

determining a position relationship between each anode plate and each cathode plate in a horizontal coordinate direction based on a horizontal coordinate of the coordinates of the target vertex of each anode plate and a horizontal coordinate of the coordinates of the target vertex of each cathode plate; and for each cathode plate, determining, based on a vertical coordinate of the coordinates of the target vertex of the cathode plate and vertical coordinates of coordinates of target vertices of two anode plates adjacent to the cathode plate, an amount of misalignment between the cathode plate and each of the two adjacent anode plates.

In a possible implementation of the second aspect, the battery cell electrode plate image is obtained by photographing an edge region of a target battery cell, and the amount of misalignment between the anode plate and cathode plate is determined based on electrode plate detection results corresponding to a plurality of battery cell electrode plate images; and the detection module is further configured to:

the detection module is configured to detect, based on a determined amount of misalignment between an anode plate and a cathode plate, whether the target battery cell is qualified.

In a possible implementation of the second aspect, the determined amount of misalignment between the anode plate and the cathode plate includes an amount of misalignment between each cathode plate and each of two adjacent anode plates in each electrode plate detection result; and the detecting, based on a determined amount of misalignment between an anode plate and a cathode plate, whether the target battery cell is qualified includes:

if there is an amount of misalignment less than or equal to a first threshold among the determined amounts of misalignment corresponding to each cathode plate, determining that the target battery cell is unqualified.

In a possible implementation of the second aspect, the detection module is further configured to:

if there is an amount of misalignment greater than or equal to a second threshold among the determined amounts of misalignment corresponding to each cathode plate, determine that the target battery cell is unqualified; or if the determined amounts of misalignment corresponding to each cathode plate are all greater than the first threshold and less than the second threshold, determine that the target battery cell is qualified.

In a possible implementation of the second aspect, the electrode plate detection result is obtained by using an electrode plate detection model, where the electrode plate detection model is used to perform electrode plate detection based on the obtained electrode plate feature after feature extraction is performed on the battery cell electrode plate image, and output the electrode plate detection result; and the electrode plate detection model is obtained through training by using the following training method:

performing image preprocessing and data enhancement on a plurality of obtained battery cell electrode plate sample images to obtain a target sample image set, where the target sample image set includes a plurality of target sample images;

labeling the anode plate and the cathode plate in each target sample image to generate label information of each target sample image, where the label information includes types and position information of the electrode plates;

generating a sample data set based on each target sample image and the label information of each target sample image; and training an initial electrode plate detection model by using the sample data set, to obtain the electrode plate detection model.

In a possible implementation of the second aspect, the image preprocessing includes filtering and/or contrast enhancement.

In a possible implementation of the second aspect, the data enhancement includes at least one of the following: random flipping, scale variation, image translation, and noise addition.

In a possible implementation of the second aspect, the training an initial electrode plate detection model by using the sample data set, to obtain the electrode plate detection model includes:

dividing the sample data set into a training set, a validation set, and a test set;

training the initial electrode plate detection model by using the training set, and during the training, adjusting hyperparameters by using the validation set, until the model converges or reaches the maximum number of training epochs, to obtain the trained initial electrode plate detection model; and after performing model evaluation on the trained initial electrode plate detection model by using the test set, generating the electrode plate detection model.

According to a third aspect, an embodiment of this application provides an electronic device, including a memory and a processor, where the memory is configured to store a computer program; and the processor is configured to perform the method according to the first aspect or any implementation of the first aspect when the computer program is invoked.

According to a fourth aspect, an embodiment of this application provides a computer-readable storage medium, where the computer-readable storage medium stores a computer program, and when the computer program is executed by a processor, the method according to the first aspect or any implementation of the first aspect is implemented.

According to a fifth aspect, an embodiment of this application provides a computer program product, where when the computer program product runs on an electronic device, the electronic device is enabled to perform the method according to any implementation of the first aspect.

According to a sixth aspect, an embodiment of this application provides a system-on-chip, including a processor, where the processor is coupled to a memory, and the processor executes a computer program stored in the memory, to implement the method according to the first aspect or any implementation of the first aspect. The system-on-chip may be a single chip or a chip module including a plurality of chips.

It may be understood that, for beneficial effects of the second aspect to the sixth aspect, reference may be made to related descriptions in the first aspect. Details are not described herein again.

BRIEF DESCRIPTION OF DRAWINGS

To describe the technical solutions in the embodiments of this application more clearly, the following briefly describes the accompanying drawings required for describing the embodiments or exemplary technologies. Apparently, the accompanying drawings in the following description show merely some embodiments of this application, and a person of ordinary skill in the art may still derive other drawings from these accompanying drawings without creative efforts.

DESCRIPTION

Figure 1:
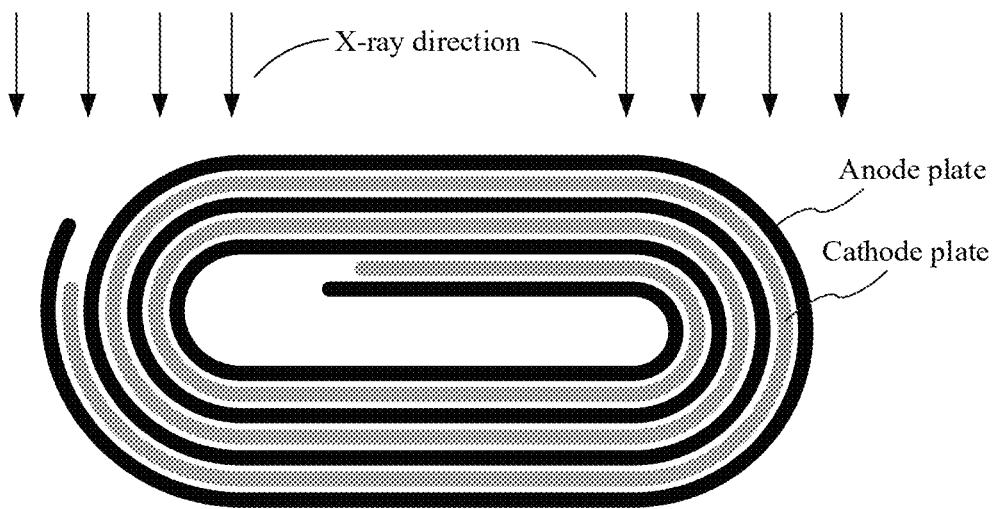
FIG. 1 is a schematic structural diagram of a front view of a battery cell according to an embodiment of this application.

The following describes the embodiments of this application with reference to the accompanying drawings in the embodiments of this application. The terms used in implementations of the embodiments of this application are merely intended to explain specific embodiments of this application, but not intended to limit this application. The specific embodiments below may be combined with each other, and same or similar concepts or processes may not be described again in some embodiments.

Naming or numbering of steps in this application does not mean that steps in a method process must be performed in a time or logical sequence indicated by the naming or numbering. An execution sequence of the named or numbered process steps may be changed according to a technical objective to be achieved, provided that same or similar technical effects can be achieved.

In the embodiments provided in this application, it should be understood that the disclosed apparatus/device and method may be implemented in other manners. For example, the described apparatus/device embodiment is merely an example. For example, the module or unit division is merely logical function division and may be other division in an actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between apparatuses or units may be implemented in electrical, mechanical, or other forms.

It should be understood that when used in the specification of this application and the appended claims, the term "include" indicates presence of the described feature, entirety, step, operation, element, and/or component, but does not preclude presence or addition of one or more other features, entireties, steps, operations, elements, components, and/or sets thereof.

In the description of this application, unless otherwise specified, the character "/" indicates an "or" relationship between associated objects. For example, A/B may represent A or B. The term "and/or" in this application is only an association relationship for describing associated objects and represents that three relationships may exist. For example, A and/or B may represent the following three cases: Only A exists, both A and B exist, and only B exists, where A and B may be in a singular or plural form.

In addition, in the description of this application, "a plurality of" means two or more, unless otherwise stated. The term "at least one of the following items" or an expression similar to the term indicates any combination of the items, and includes a single item or any combination of a plurality of items. For example, at least one of a, b, or c may indicate: a, b, c, a-b, a-c, b-c, or a-b-c, where a, b, and c may be in a singular or plural form.

As used in the specification of this application and the appended claims, the term "if" may be interpreted as "when". "once", "in response to determining", or "in response to detecting", depending on the context. Similarly, the phrase "if determining" or "if detecting [the described condition or event]" may be interpreted as "once determining", "in response to determining", "once detecting [the described condition or event]", or "in response to detecting [the described condition or event]", depending on the context.

In addition, terms such as "first" and "second" in the description of the specification of this application and the appended claims are used to distinguish similar objects, and not necessarily used to describe a specific order or sequence, and shall not be understood as an indication or implication of relative importance or an implicit indication of a quantity of indicated technical features. It should be understood that the terms used in this way are interchangeable in appropriate circumstances, so that the embodiments described herein can be implemented in other orders than the order illustrated or described herein. In addition, features defined by "first" and "second" may explicitly or implicitly include at least one of the features.

Reference to "an embodiment", "some embodiments", or the like described in this specification of this application means that one or more embodiments of this application include a specific feature, structure, or characteristic described with reference to the embodiment. Therefore, expressions such as "in an embodiment", "in some embodiments", "in some other embodiments", and "in some different embodiments" appearing in different places in this specification do not necessarily indicate reference to a same embodiment, but mean "one or more but not all embodiments", unless otherwise specified in another way.

To reduce lithium precipitation at an anode, in a battery cell structure of a lithium battery, an overhang design is usually used, so that a part of an anode plate is beyond a cathode plate in length and width directions, that is, there is an amount of misalignment between an edge of the anode plate and an edge of the cathode plate. The battery cell is mainly formed by winding or stacking the anode plate and the cathode plate. The anode plate and the cathode plate are separated by a separator. The inventor finds that during production of the battery cell, when the battery cell is wound or folded, the amount of misalignment between the electrode plates in the battery cell is likely to deviate in the width direction. However, if the amount of misalignment between the anode plate and the cathode plate is excessively small, the foregoing lithium precipitation problem is likely to occur. Therefore, it is necessary to detect the amount of misalignment during production inspection of lithium batteries.

In a possible detection manner, X-rays are used to capture X-ray images of an anode plate and a cathode plate in the battery cell, a conventional image algorithm or a deep learning detection method is used to locate cathode and anode targets (that is, the anode plate and the cathode plate), and then the amount of misalignment between the anode plate and the cathode plate of the battery cell is calculated. However, the inventor finds that this detection algorithm is poorly resistant to interference and prone to missed detection and inaccurate positioning problems.

To improve accuracy of a detection result, the inventor finds through research that an attention mechanism can help find a region of real interest in a target detection process, filter out useless information, and effectively improve accuracy of target detection. A spatial structure of the cathode and anode targets is important in detection of the cathode and anode targets in the battery cell, and paying attention to position information can help extract a more effective feature. In addition, in target detection, a multi-channel mechanism may be used to extract a richer feature, and paying attention to channel information can help extract a more effective feature.

Based on the foregoing considerations, the inventor, after in-depth research, proposes a battery cell electrode plate detection solution, where feature extraction is performed on a battery cell electrode plate image, position information of an anode plate and a cathode plate in the battery cell electrode plate image is detected based on an extracted electrode plate feature, and then an amount of misalignment between the anode plate and the cathode plate is determined; in addition, an attention mechanism is added to the feature extraction process to extract a channel attention feature embedded with the position information, so as to obtain a more effective feature and further improve accuracy of a detection result.

In the battery cell electrode plate detection solution, the feature extraction process can extract an effective feature, thereby improving accuracy of the electrode plate detection result and further improving accuracy of an amount-of-misalignment detection result. In addition, the feature extraction process can reduce data dimensionality, and therefore can also improve detection efficiency. Because the attention mechanism is added to the feature extraction process to extract the channel attention feature including the embedded position information, the position information of the electrode plates and a feature channel relationship in the battery cell electrode plate image can be captured. This can effectively improve effectiveness of the extracted feature and further improve accuracy of the amount-of-misalignment detection result.

A battery cell electrode plate detection method provided in an embodiment of this application may be used to detect various battery cells with an overhang design. For ease of description, the following uses a battery cell structure shown in FIG. 1 as an example for description.

Figure 3:
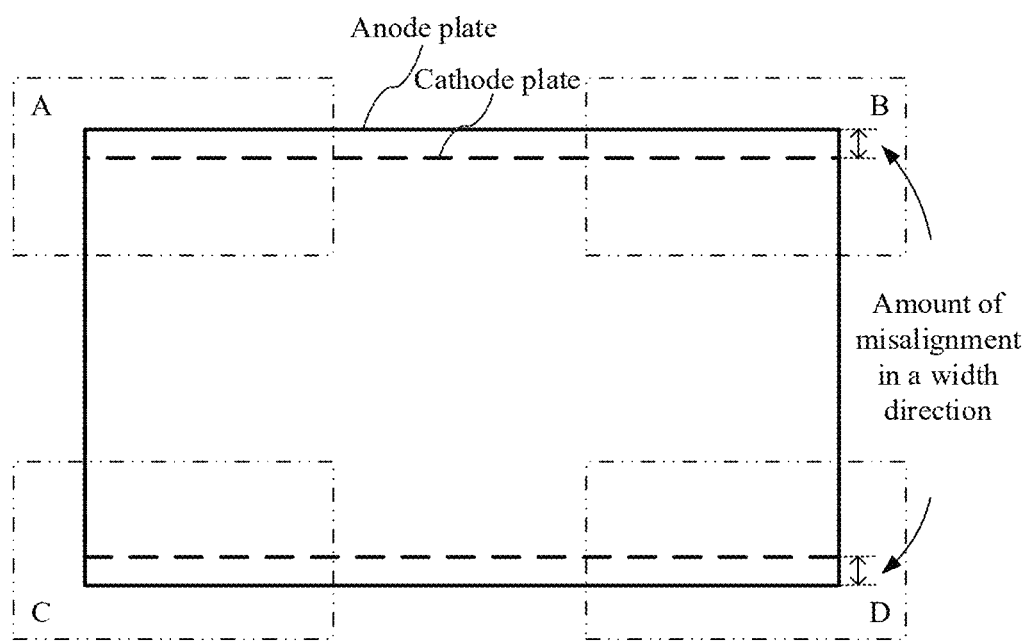
FIG. 3 is a schematic structural diagram of a top view of a battery cell according to an embodiment of this application.

FIG. 1 is a schematic structural diagram of a front view of a battery cell. The battery cell is a winding battery cell. The battery cell is mainly formed by winding an anode plate and a cathode plate, and the anode plate and the cathode plate are separated by a separator. FIG. 3 is a schematic structural diagram of a top view of the battery cell shown in FIG. 1. As shown in FIG. 3, in a height direction of the battery cell, that is, a width direction of an electrode plate, two ends of the anode plate exceed the cathode plate to form an overhang region, and there is an amount of misalignment between the anode plate and the cathode plate.

In detection of the amount of misalignment between the electrode plates of the battery cell, a perspective imaging device such as an X-ray imaging device or a computed tomography (Computed Tomography, CT) device may be used to capture an image of the battery cell to obtain a battery cell electrode plate image. For ease of description, the technical solution of this application is subsequently described in this embodiment of this application by using an example in which an X-ray imaging device is used to capture and obtain a battery cell electrode plate image, that is, the battery cell electrode plate image is an X-ray image.

For the battery cell shown in FIG. 1, because the battery cell is bent to a large extent in the width direction during winding, the amount of misalignment between the cathode plate and the anode plate is likely to deviate. Based on this, as shown in FIG. 1, during specific capture, X-rays may be emitted in the width direction of the battery cell, and edge regions located at two ends (that is, wide-edge regions) in the length direction of the battery cell may be photographed separately, and a battery cell electrode plate image shown in FIG. 2 is obtained.

Figure 2:
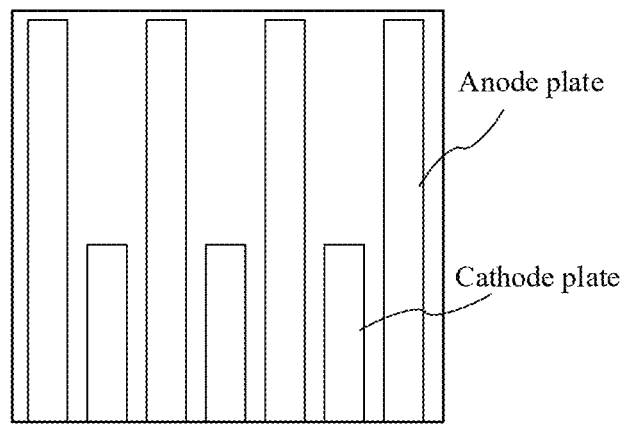
FIG. 2 is a schematic diagram of a battery cell electrode plate image according to an embodiment of this application.

FIG. 2 is a schematic diagram of a position relationship between the anode plate and the cathode plate in a battery cell electrode plate image corresponding to one edge region. As shown in FIG. 2, the anode plate and the cathode plate are arranged alternately, and there is an amount of misalignment between the anode plate and the cathode plate.

It may be understood that FIG. 2 is only an example for showing the position relationship between the anode plate and the cathode plate in the photographed battery cell electrode plate image and does not represent an actual battery cell electrode plate image. In addition, the number of winding layers of the anode plate and the number of winding layers of the cathode plate shown in FIG. 1 and FIG. 2 are also only examples, both for indicating the position relationship between the anode plate and the cathode plate only. In an actual product, a battery cell may include more winding layers than shown in the figure.

As shown in FIG. 3, the two ends in the height direction of the battery cell (that is, the width direction of the electrode plate) may be photographed separately, and battery cell electrode plate images are obtained by photographing four edge regions A, B, C, and D located at corners of the battery cell.

For each of the four edge regions, one or more battery cell electrode plate images may be captured; or one or more images may be captured for the entire battery cell in a photographing direction shown in FIG. 1, and then the captured images are cropped to obtain a plurality of battery cell electrode plate images corresponding to each edge region.

It may be understood that during image capture, the four regions A, B, C, and D may be mainly photographed as described above to obtain battery cell electrode plate images to improve detection efficiency; or other regions of the battery cell may be photographed, for example, X-rays may be emitted in the width direction of the battery cell, and the two ends in the height direction of the battery cell may be photographed separately; or two sides in the width direction of the battery cell may be photographed to obtain a more comprehensive battery cell electrode plate image. A manner of capturing battery cell electrode plate images and a quantity of captured images are not particularly limited in this embodiment of this application. For ease of description, an example in which four battery cell electrode plate images are obtained by separately photographing the four regions A, B, C, and D is subsequently used as an example for description in this embodiment of this application.

After a battery cell electrode plate image is captured, the amount of misalignment between the cathode plate and the anode plate may be detected based on the battery cell electrode plate image. To improve detection efficiency and accuracy of the detection result, the battery cell electrode plate image may be first cropped to obtain a region of interest (Region of Interest, ROI), and then preprocessing such as filtering and/or contrast enhancement may be performed on the ROI to obtain a battery cell electrode plate image in which the cathode plate and the anode plate can be clearly distinguished. Then detection may be performed on these to-be-detected battery cell electrode plate images to determine the amount of misalignment between the anode plate and the cathode plate of the battery cell. The following describes the detection process in detail.

Figure 4:
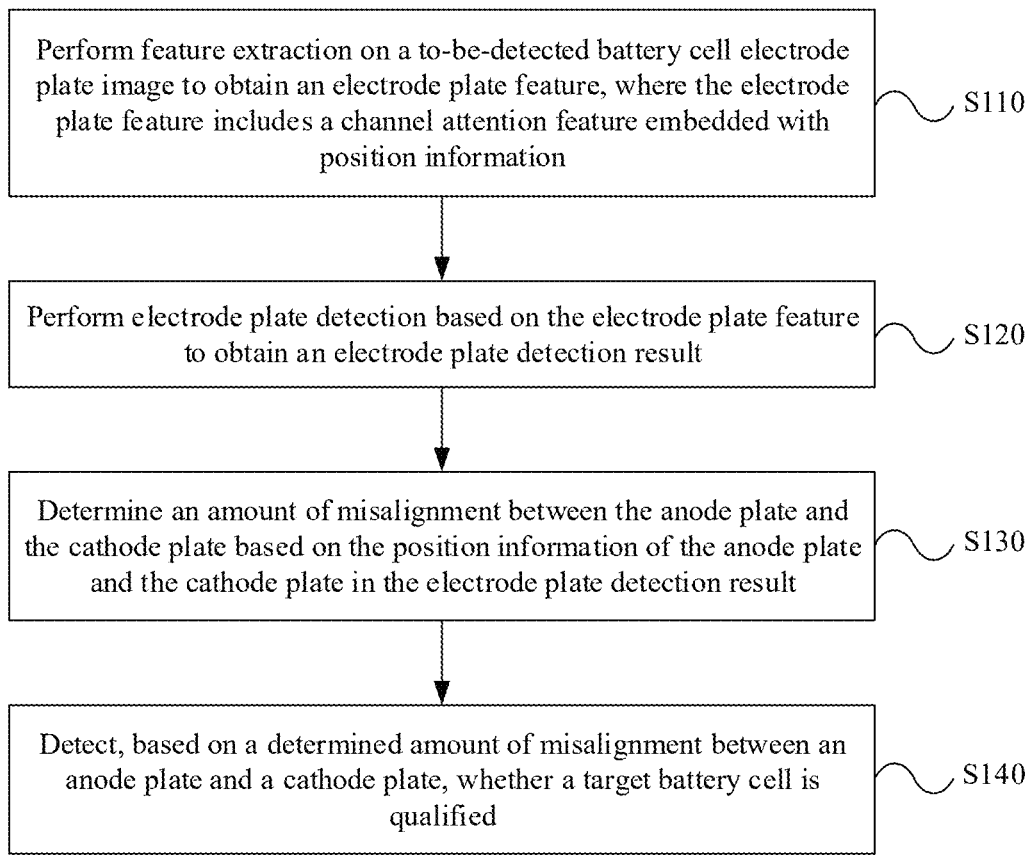
FIG. 4 is a schematic flowchart of a battery cell electrode plate detection method according to an embodiment of this application.

FIG. 4 is a schematic flowchart of a battery cell electrode plate detection method according to an embodiment of this application. As shown in FIG. 4, the method may include the following steps.

S110. Perform feature extraction on a to-be-detected battery cell electrode plate image to obtain an electrode plate feature, where the electrode plate feature includes a channel attention feature embedded with position information.

Specifically, during feature extraction, various conventional feature extraction algorithms may be used, or a neural network such as a deep neural network or a convolutional neural network may be used, to improve a feature extraction effect.

In the process of feature extraction, a multi-channel mechanism may be used to extract a richer feature. In addition, an attention mechanism may be added to the neural network to capture position information of electrode plates and a feature channel relationship in the battery cell electrode plate image and obtain the channel attention feature embedded with the position information, so as to obtain a more effective feature.

A specific attention mechanism used may be a convolutional block attention module (Convolutional Block Attention Module, CBAM) or coordinate attention (Coordinate Attention, CA).

The CBAM attention mechanism introduces position information by performing global pooling on a channel. In this way, partial spatial structure information can be captured.

The CA attention mechanism decomposes channel attention into two one-dimensional feature encoding processes that aggregate features along two spatial directions respectively. In this way, a remote dependency can be captured along one spatial direction, while accurate position information along another spatial direction is reserved. Feature maps generated thereby are encoded as a pair of direction-aware and position-sensitive feature maps respectively, and the feature maps are both applied to an input feature map. Therefore, a feature representation of a target to be detected is enhanced. In an embodiment of this application, the CA attention mechanism is used to improve the feature extraction effect, and this is also used as an example for description subsequently.

Figure 5:
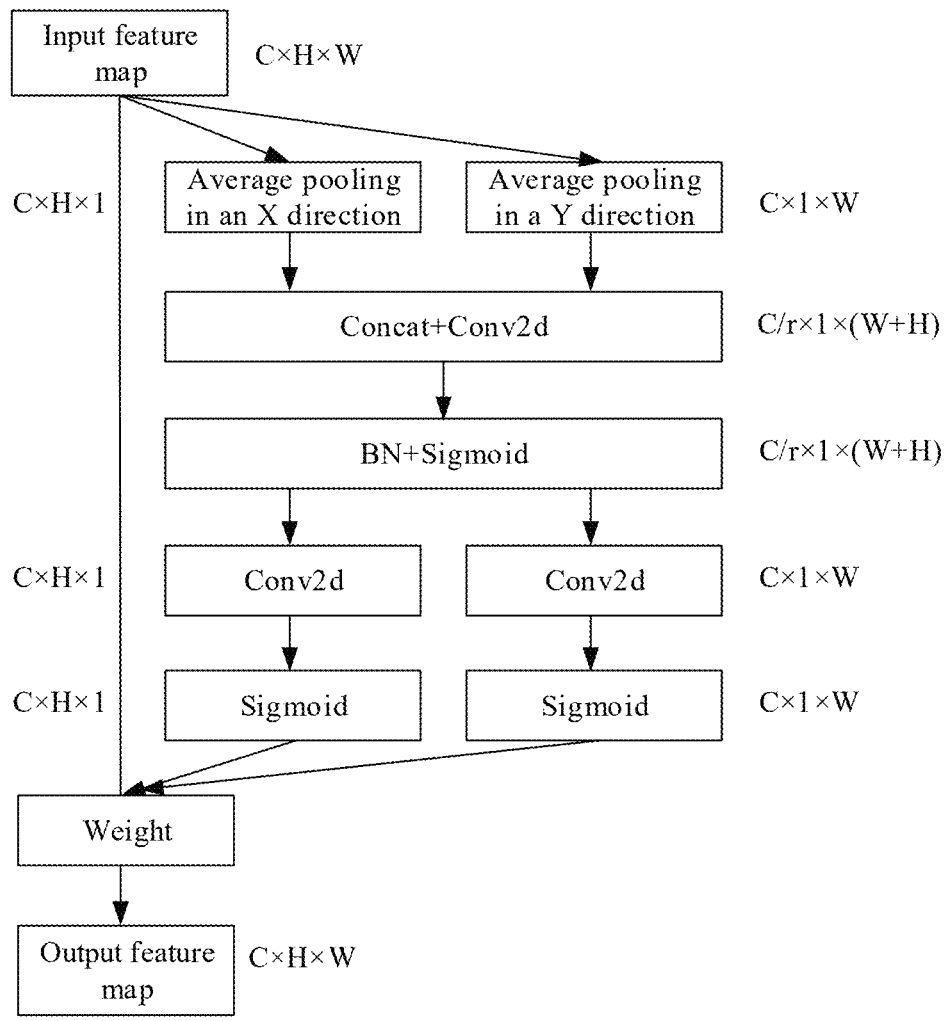
FIG. 5 is a schematic structural diagram of a CA attention mechanism according to an embodiment of this application.

FIG. 5 is a schematic structural diagram of a CA attention mechanism according to an embodiment of this application. As shown in FIG. 5, the CA attention mechanism may include the following steps.

In the first step, global average pooling (Avg Pool) is performed on the input feature map along a horizontal direction (that is, an X direction or a width direction) and a vertical direction (that is, a Y direction or a height direction) respectively, to obtain feature maps in the width direction and the height direction respectively.

A size of the input feature map is C×H×W, where C represents the number of channels, H represents a height, and W represents a width. Pooling kernels are (1, W) and (H, 1) respectively. Sizes of the feature maps in the width direction and the height direction that are obtained after the global average pooling operation is performed are C×H×1 and C×1×W respectively.

In the second step, the feature maps in the width direction and the height direction are concatenated (Concat) and fed into a shared convolution module whose convolution kernel is 1×1, so that a two-dimensional convolution (Conv2d) operation is performed to reduce dimensionality thereof to C/r of the original dimensionality and obtain a feature map with a size of C/r×1×(W+H).

In the third step, after batch normalization (BatchNorm, BN) processing is performed, the feature map is fed into a Sigmoid activation function for non-linear (Non-linear) transformation, to obtain a C/r×1×(W+H) feature map f.

In the fourth step, the feature map f is decomposed into two separate tensors along a spatial dimension, and two-dimensional convolution (whose convolution kernel is 1×1) is performed on the tensors respectively to obtain a feature map Fh with a size of C×H×1 and a feature map Fw with a size of C×1×W.

In the fifth step, after the feature map Fh and the feature map Fw pass through the Sigmoid activation function, an attention weight of the feature map in the height direction and an attention weight of the feature map in the width direction are obtained respectively.

In the sixth step, the obtained attention weight in the height direction and attention weight in the width direction of the input feature map are applied to the original input feature map, and a final feature map with attention weights in the width direction and the height direction are obtained through multiplicative weighting calculation.

In a specific implementation, one or more attention operations may be performed during feature extraction. For example, one or more CA attention modules may be embedded in the neural network, where the CA attention module may be embedded at any position in the neural network, and this is not particularly limited in this embodiment.

S120. Perform electrode plate detection based on the electrode plate feature to obtain an electrode plate detection result.

After the electrode plate feature is extracted, electrode plate detection may be performed on the battery cell electrode plate image based on the extracted electrode plate feature by using a related target detection algorithm, to obtain the electrode plate detection result, where the electrode plate detection result may include position information of an anode plate and a cathode plate.

For the target detection algorithm, a two-stage (two stage) target detection algorithm may be used, or a one-stage (one stage) target detection algorithm may be used, to increase a detection speed.

The one-stage target detection algorithm may include a single shot multibox detector (Single Shot MultiBox Detector, SSD) algorithm, a YOLO algorithm, or the like.

The electrode plate detection result may specifically include a detected type and position information of each detection box, where each detection box is used to represent an electrode plate, and the type of the detection box is used to indicate whether the electrode plate represented by the detection box is an anode plate or a cathode plate, that is, the type of the detection box may include an anode plate and a cathode plate. For example, 0 may be used to represent an anode plate and 1 may be used to represent a cathode plate.

Figure 6:
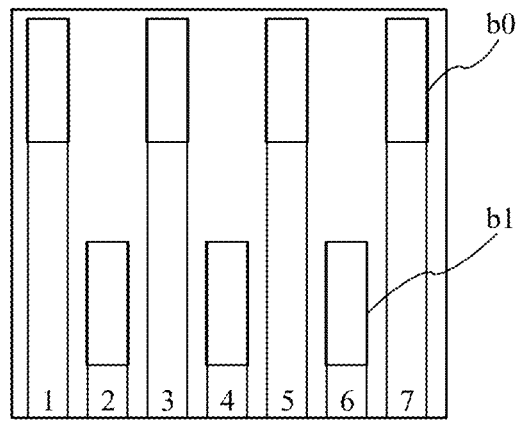
FIG. 6 is a schematic diagram of an electrode plate detection result according to an embodiment of this application.

FIG. 6 is a schematic diagram of an electrode plate detection result. As shown in FIG. 6, the electrode plate detection result may include a detection box b0 corresponding to each anode plate and a detection box b1 corresponding to each cathode plate in the battery cell electrode plate image, and each detection box has corresponding position information (not shown).

The position information of the detection box may include coordinates of a central point of the detection box and a width and height of the detection box. Certainly, the position information of the detection box may alternatively be indicated in other manners. For example, in some target detection algorithms, coordinates of other positions in the detection box may also be used to indicate a location of the detection box. This is not particularly limited in this embodiment. For ease of description, the position information of the detection box including the coordinates of the central point and the width and height of the detection box is used as an example for description subsequently.

S130. Determine an amount of misalignment between the anode plate and the cathode plate based on the position information of the anode plate and the cathode plate in the electrode plate detection result.

Based on position information of each anode plate and each cathode plate in the electrode plate detection result, the amount of misalignment between the cathode plate and the anode plate may be determined after the electrode plate detection result is obtained.

Figure 7:
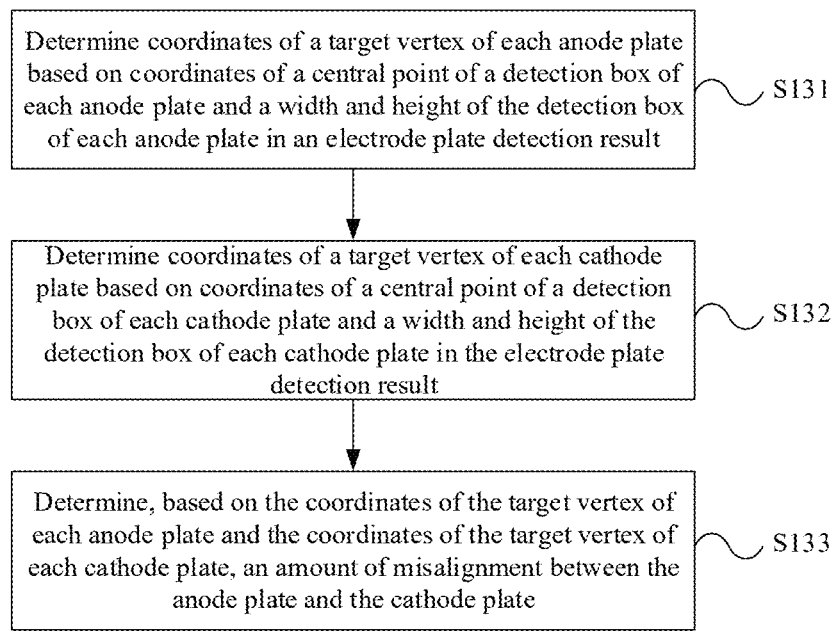
FIG. 7 is a schematic flowchart of a method for determining an amount of misalignment based on an electrode plate detection result according to an embodiment of this application.

Specifically, determining the amount of misalignment between the cathode plate and the anode plate may be implemented according to a method shown in FIG. 7. FIG. 7 is a schematic flowchart of a method for determining an amount of misalignment based on an electrode plate detection result according to an embodiment of this application. As shown in FIG. 7, the method may include the following steps.

S131. Determine coordinates of a target vertex of each anode plate based on coordinates of a central point of a detection box of each anode plate and a width and height of the detection box of each anode plate in the electrode plate detection result.

S132. Determine coordinates of a target vertex of each cathode plate based on coordinates of a central point of a detection box of each cathode plate and a width and height of the detection box of each cathode plate in the electrode plate detection result.

S133. Determine, based on the coordinates of the target vertex of each anode plate and the coordinates of the target vertex of each cathode plate, the amount of misalignment between the anode plate and the cathode plate.

In steps S131 and S132, the target vertex may be an upper left vertex or an upper right vertex of the detection box.

Assuming that the target vertex is the upper left vertex of the detection box, coordinates of the upper left vertex of the detection box may be determined by using the following formulas: $Vx=Cx-w/2$ and $Vy=Cy+h/2$.

(Vx, Vy) represents the coordinates of the upper left vertex of the detection box, (Cx, Cy) represents the coordinates of the central point of the detection box, w represents the width of the detection box, and h represents the height of the detection box. Herein, an example in which a coordinate origin is located at a lower left corner of the image is used for description. In some embodiments, alternatively, a coordinate origin may be located at an upper left corner of the image, and correspondingly, $Vy=Cy-h/2$.

It may be understood that, in some embodiments, the position information of the detection box in the electrode plate detection result may also include the coordinates of the target vertex of the detection box. In this case, the amount of misalignment between the anode plate and the cathode plate may be determined directly based on the coordinates of the target vertex of each anode plate and the coordinates of the target vertex of each cathode plate.

In step S133, a cathode plate adjacent to each anode plate or an anode plate adjacent to each cathode plate may be determined based on the coordinates of the target vertex of each anode plate and the coordinates of the target vertex of each cathode plate, and then an amount of misalignment between each anode plate and the adjacent cathode plate or an amount of misalignment between each cathode plate and the adjacent anode plate may be determined.

For example, with respect to the electrode plate detection result shown in FIG. 6, for a first anode plate 1 on the left, it may be determined, based on horizontal coordinates of the coordinates of the target vertices of each cathode plate and each anode plate, that a cathode plate adjacent to the anode plate 1 is a cathode plate 2, and then an amount of misalignment between the anode plate 1 and the cathode plate 2 may be calculated based on vertical coordinates of the coordinates of the target vertices of the anode plate 1 and the cathode plate 2.

Figure 8:
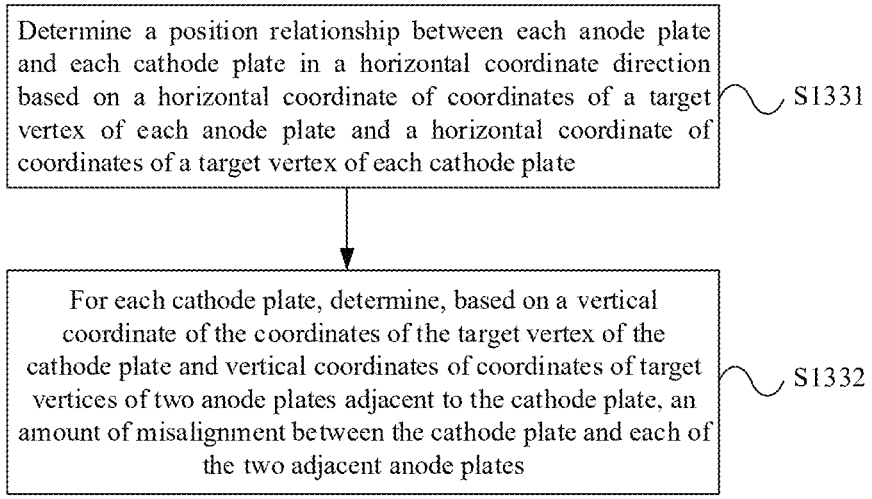
FIG. 8 is a schematic flowchart of a method for determining an amount of misalignment based on coordinates of target vertices of each cathode plate and anode plate according to an embodiment of this application.

To improve detection efficiency, optionally, in some embodiments, referring to FIG. 8, determining the amount of misalignment between the cathode plate and the anode plate based on the coordinates of the target vertex of each cathode plate and the coordinates of the target vertex of each anode plate may be implemented by the following steps.

S1331. Determine a position relationship between each anode plate and each cathode plate in a horizontal coordinate direction based on a horizontal coordinate of the coordinates of the target vertex of each anode plate and a horizontal coordinate of the coordinates of the target vertex of each cathode plate.

The position relationship may be indicated by sequence numbers obtained by sorting each anode plate and each cathode plate. For example, seven electrode plates are included in FIG. 6, and a sequence number of each electrode plate may be obtained by sorting each electrode plate in the horizontal coordinate direction based on the horizontal coordinate of the coordinates of the target vertex of each electrode plate, where sequence numbers of the anode plates are 1, 3, 5, and 7 sequentially; and sequence numbers of the cathode plates are 2, 4, and 6 sequentially.

S1332. For each cathode plate, determine, based on a vertical coordinate of the coordinates of the target vertex of the cathode plate and vertical coordinates of coordinates of target vertices of two anode plates adjacent to the cathode plate, an amount of misalignment between the cathode plate and each of the two adjacent anode plates.

After the position relationship is determined, it is possible to determine an amount of misalignment between the cathode plate 2 and each of the adjacent anode plate 1 and an adjacent anode plate 3, an amount of misalignment between a cathode plate 4 and each of the adjacent anode plate 3 and an adjacent anode plate 5, and an amount of misalignment between a cathode plate 6 and each of the adjacent anode plate 5 and an adjacent anode plate 7.

Assuming that the target vertex is the upper left vertex and using the cathode plate 2 as an example, the amounts of misalignment between the cathode plate 2 and the two adjacent anode plates (anode plate 1 and anode plate 3) may be determined specifically by using the following formulas: $O12=Vy1-Vy2$ and $O32=Vy3-Vy2$.

O12 represents the amount of misalignment between the cathode plate 2 and the anode plate 1, O32 represents the amount of misalignment between the cathode plate 2 and the anode plate 3, Vy1 represents a vertical coordinate of an upper left vertex of the anode plate 1, Vy2 represents a vertical coordinate of an upper left vertex of the cathode plate 2, and Vy3 represents a vertical coordinate of an upper left vertex of the anode plate 3.

Similarly, amounts of misalignment between other cathode plates and adjacent anode plates may be obtained, and each cathode plate corresponds to two amounts of misalignment. Correspondingly, six amounts of misalignment may be obtained based on the electrode plate detection result shown in FIG. 6.

It may be understood that the amount of misalignment between each anode plate and the adjacent cathode plate may alternatively be determined by using the anode plate as a benchmark, where two anode plates located at two ends have one adjacent cathode plate, and the other anode plates have two adjacent cathode plates. A specific determining process is similar to the foregoing process of determining the amount of misalignment by using the cathode plate as a benchmark. Details are not described herein.

In this embodiment, the feature extraction process can extract an effective feature, thereby improving accuracy of the electrode plate detection result and further improving accuracy of an amount-of-misalignment detection result. In addition, the feature extraction process can reduce data dimensionality, and therefore can also improve detection efficiency. Because the attention mechanism is added to the feature extraction process to extract the channel attention feature including the embedded position information, the position information of the electrode plates and the feature channel relationship in the battery cell electrode plate image can be captured. This can effectively improve effectiveness of the extracted feature, further improve accuracy of the electrode plate detection result, and further improve accuracy of the amount-of-misalignment detection result.

In some embodiments of this application, optionally, with continued reference to FIG. 4, after step S130, the method may further include step S140: Detect, based on a determined amount of misalignment between an anode plate and a cathode plate, whether a target battery cell is qualified.

Specifically, after the amount of misalignment between the anode plate and the cathode plate of the battery cell is determined, it is possible to determine whether the determined amount of misalignment meets a requirement, and further determine whether the battery cell (that is, the target battery cell) is qualified.

Whether the target battery cell is qualified may be determined based on an amount-of-misalignment detection result corresponding to one battery cell electrode plate image of the target battery cell, and when an amount of misalignment in the amount-of-misalignment detection result corresponding to the battery cell electrode plate image does not meet the requirement, it may be determined that the target battery cell is unqualified.

To obtain a more accurate detection result, in this embodiment, whether the target battery cell is qualified may be determined based on amount-of-misalignment detection results corresponding to a plurality of battery cell electrode plate images of the target battery cell, that is, the amount of misalignment between the anode plate and the cathode plate as a basis for determining whether the target battery cell is qualified is determined based on electrode plate detection results corresponding to the plurality of battery cell electrode plate images, where the plurality of battery cell electrode plate images may be obtained by photographing a plurality of edge regions of the target battery cell. For example, the plurality of battery cell electrode plate images may include the four battery cell electrode plate images obtained by photographing the four regions A, B, C, and D, as described in the embodiment shown in FIG. 3; and for each battery cell electrode plate image, an amount-of-misalignment detection result corresponding to the battery cell electrode plate image may be determined by using the foregoing steps S110 to S130.

After an amount-of-misalignment detection result corresponding to each battery cell electrode plate image is determined, it is possible to determine whether each determined amount of misalignment meets the requirement. If there is an amount of misalignment that does not meet the requirement, it may be determined that the target battery cell is unqualified. If each amount of misalignment meets the requirement, it may be determined that the target battery cell is qualified.

Figure 9:
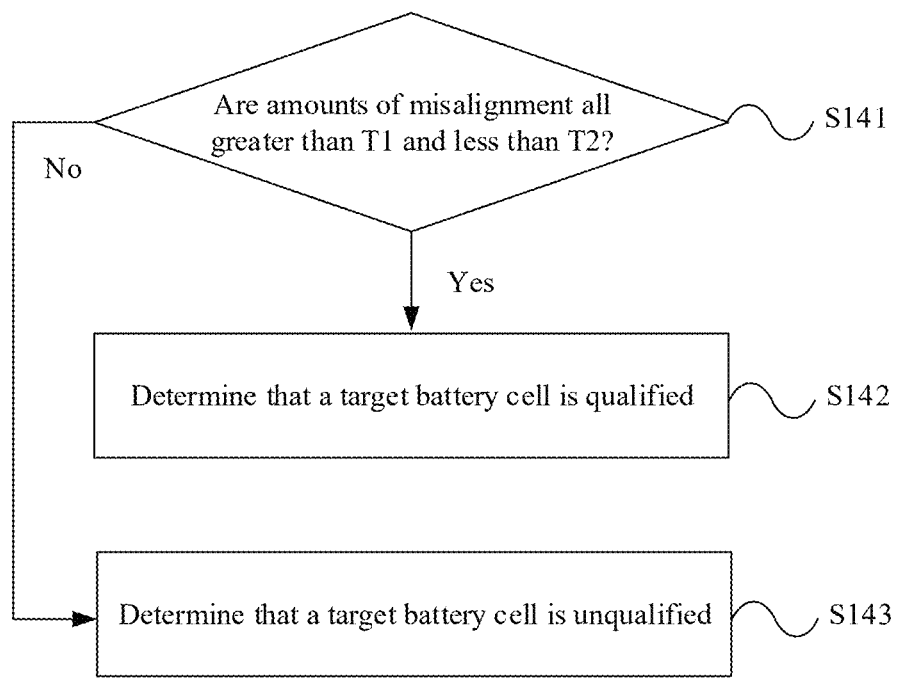
FIG. 9 is a schematic flowchart of a method for detecting whether a target battery cell is qualified according to an embodiment of this application.

In some embodiments of this application, optionally, referring to FIG. 9, detecting whether the target battery cell is qualified may specifically include the following steps.

S141. Determine whether the amounts of misalignment corresponding to each cathode plate are all greater than a first threshold T1 and less than a second threshold T2; if yes, perform step 142; otherwise, perform step 143.

The first threshold T1 may be a lower limit for the amount of misalignment between the anode plate and the cathode plate in an overhang design of the battery cell. If the determined amount of misalignment is less than the first threshold T1, it indicates that the amount of misalignment is excessively small, and a lithium precipitation problem is likely to occur. Therefore, it can be determined that the target battery cell is unqualified.

The second threshold T2 may be an upper limit for the amount of misalignment between the anode plate and the cathode plate in the overhang design of the battery cell. When the amount of misalignment between the anode plate and the cathode plate is excessively large, energy density of a lithium battery is affected. If the determined amount of misalignment is greater than the second threshold T2, it indicates that the amount of misalignment is excessively large. Therefore, it can be determined that the target battery cell is unqualified.

S142. Determine that the target battery cell is qualified.

If the amounts of misalignment corresponding to each cathode plate are all greater than the first threshold T1 and less than the second threshold T2, it may be determined that the target battery cell is qualified.

It may be understood that, that the target battery cell is qualified herein means that the amount of misalignment between the cathode plate and the anode plate of the target battery cell conforms to the overhang design, that is, the target battery cell is qualified in terms of amount-of-misalignment detection, but it does not mean that the target battery cell is also qualified in other detection items.

S143. Determine that the target battery cell is unqualified.

If there is an amount of misalignment less than or equal to the first threshold T1 among the determined amounts of misalignment corresponding to each cathode plate, it may be determined that the target battery cell is unqualified.

If there is an amount of misalignment greater than or equal to the second threshold T2 among the determined amounts of misalignment corresponding to each cathode plate, it may also be determined that the target battery cell is unqualified.

Through the determining based on the first threshold, it is possible to determine a battery cell in which an amount of misalignment between a cathode plate and an anode plate is excessively small. Therefore, a risk of lithium precipitation in a delivered lithium battery product can be reduced.

Through the determining based on the second threshold, it is possible to determine a battery cell in which an amount of misalignment between a cathode plate and an anode plate is excessively large. Therefore, energy density of a delivered lithium battery product can be increased.

It may be understood that, in some embodiments of this application, alternatively, part of the steps in FIG. 9 may be performed. For example, only the determining based on the first threshold T1 may be performed to detect an unqualified battery cell in which an amount of misalignment between a cathode plate and an anode plate is excessively small; or step S142 may not be performed, only a battery cell with an unqualified amount of misalignment between a cathode plate and an anode plate is detected, and after detection of other detection items of the battery cell is completed, if it is determined that detection results of all the detection items meet requirements, the battery cell is determined as qualified.

In some embodiments of this application, optionally, in step S110, the YOLO algorithm may be used to extract the electrode plate feature, where the YOLO algorithm may include a backbone (Backbone) network, a neck (Neck) network, and a head prediction (Head Prediction) network, where the backbone network is used for feature extraction, the neck network is used for feature fusion based on a feature extracted by the backbone network, and the head prediction network is used to predict, based on a feature fusion result of the neck network, a detection box corresponding to a target.

In this embodiment, to improve accuracy of the electrode plate detection result, a YOLOv4 or YOLOv5 algorithm may be used specifically, where the backbone network and the neck network may include a plurality of convolution modules, a spatial pyramid pooling (Spatial Pyramid Pooling, SPP) module, a feature pyramid network (Feature Pyramid Network, FPN) module, and a path aggregation network (Path Aggregation Network, PAN) module.

The foregoing attention module may be added to the backbone network to improve a feature extraction effect at an early feature extraction stage, and further, better results can be obtained in subsequent feature fusion and target prediction. One or more attention modules may be added.

The convolution module is configured to perform a convolution operation on the input feature map to extract a partial feature. The SPP module is configured to perform multi-scale pooling on the input feature map to extract spatial feature information of different sizes and concatenate all outputs to implement fusion of the multi-scale feature information and improve robustness of the network in terms of spatial layout and object variability. The SPP module can convert a feature map of any size into a feature map of a fixed size.

The FPN module is configured to perform a feature fusion operation from deep to shallow on the feature extracted by the backbone network. The PAN module is configured to perform a feature fusion operation from shallow to deep on the feature fused by the FPN module. The FPN module can enhance semantic information and the PAN module can enhance positioning information, both of which can enable the model to obtain richer feature information.

Figure 10:
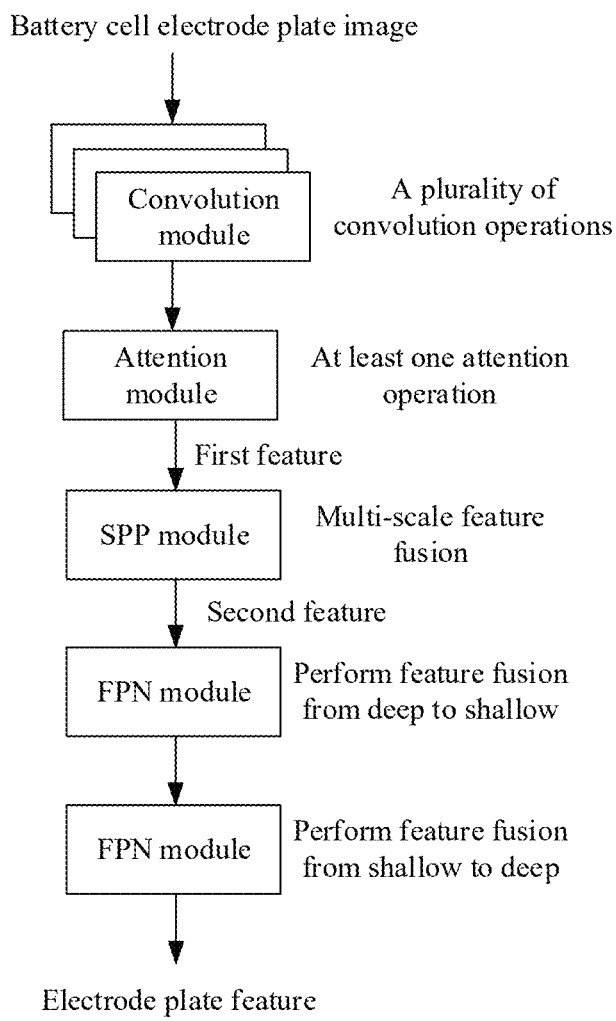
FIG. 10 is a schematic diagram of a process of determining an electrode plate feature according to an embodiment of this application.

Based on the foregoing network structure, correspondingly, as shown in FIG. 10, in step S110, during extraction of the electrode plate feature, a plurality of convolution operations and at least one attention operation may be first performed on the to-be-detected battery cell electrode plate image by using the plurality of convolution modules and the added attention module, to obtain a first feature; then multi-scale feature fusion may be performed on the first feature by using the SPP module, to obtain a second feature; and then feature fusion from deep to shallow and then from shallow to deep may be performed on the second feature by using the FPN module and the PAN module, to obtain the electrode plate feature.

In an embodiment of this application, a specific target detection algorithm (that is, an electrode plate detection algorithm) used to extract the electrode plate feature and perform electrode plate detection is the YOLOv5 algorithm, where the YOLOv5 algorithm includes a plurality of versions, and any version of the YOLOv5 algorithm may be used in this embodiment.

Figure 11:
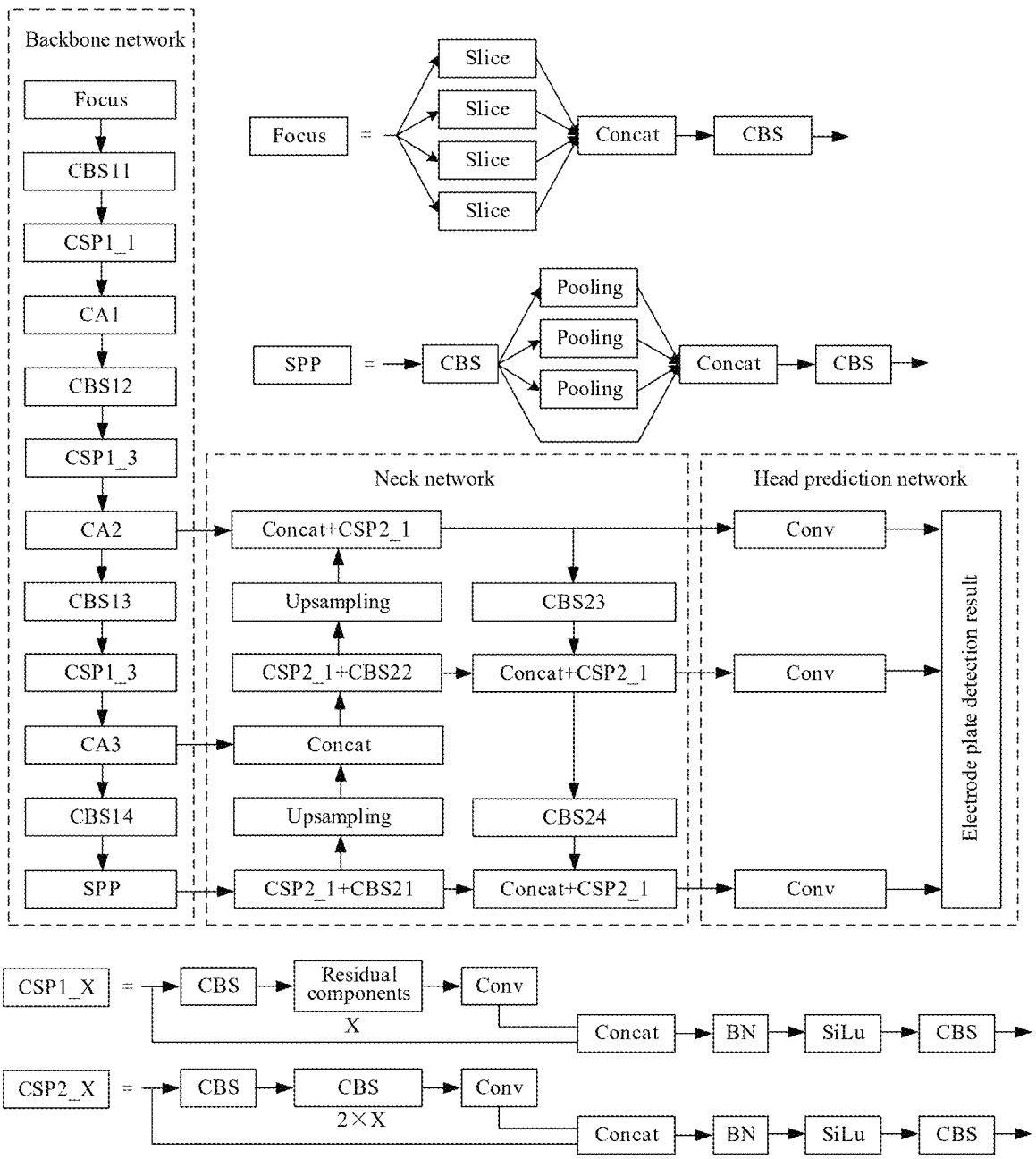
FIG. 11 is a schematic diagram of a network structure of an electrode plate detection algorithm according to an embodiment of this application.

FIG. 11 is a schematic diagram of a network structure of an electrode plate detection algorithm according to an embodiment of this application. As shown in FIG. 11, the electrode plate detection algorithm is specifically the YOLOv5 algorithm, and the backbone network in this algorithm model may specifically include a focus module, a plurality of CBS modules, a plurality of cross-stage partial (Cross Stage Partial, CSP) modules, and an SPP module. The foregoing attention module may be added before the SPP module.

The focus module is configured to perform a slicing (Silce) operation on the input image, that is, an input image channel is expanded to four times the original one by performing sampling at intervals of one pixel in horizontal and vertical coordinate directions on the original image. Then the slices are concatenated (Concat), and then one convolution operation is performed by using the CBS module, to obtain a downsampled feature map, to improve a receptive field of each feature point, while reducing the amount of calculation and increasing a feature extraction speed.

The CBS module includes a convolution (Conv) module, a batch normalization (BN) module, and a SiLu activation module, and is configured to perform a standard convolution operation on the input feature map to extract a partial feature in the feature map.

The CSP module divides the input feature map into two branches. One branch first passes through the CBS module and then passes a plurality of residual components (Res unit), and then one convolution operation is performed. Then the two branches are concatenated (Concat), then a BN operation and one SiLu activation operation are performed, and finally the downsampled feature map is obtained by using one CBS module. The CSP module can optimize gradient information in the backbone network, thereby effectively enhancing a learning capability of the network and improving accuracy of the detection result while reducing the amount of calculation and memory costs.

The SPP module is configured to pass the input feature map through the CBS module first, then perform a maximum pooling (MaxPool) operation by using pooling kernels of different sizes, then perform multi-scale feature fusion by using the Concat module, and then restore an output to an initial input size by using one CBS module.

In some embodiments, the CBS module may also be replaced with a CBL module, and a main difference between the CBL module and the CBS module is that the activation module uses a Leaky relu activation function.

Based on the foregoing network structure, correspondingly, in the process of obtaining the first feature shown in FIG. 10, a slicing operation and then a convolution operation may be first performed on the to-be-detected battery cell electrode plate image by using the focus module, to obtain an initial feature; then a plurality of convolution, batch normalization, activation, and cross-stage partial fusion operations are performed on the initial feature by using the plurality of CBS modules and the plurality of CSP modules, to obtain a target partial feature; and then an attention operation is performed on the target partial feature by using the attention module, to obtain the first feature.

In some embodiments of this application, optionally, a specific version used for the electrode plate detection algorithm is YOLOv5s, to improve accuracy of the detection result and increase the detection speed while saving storage space. In FIG. 11, the YOLOv5s algorithm is used as an example for description.

With continued reference to FIG. 11, the backbone network may specifically include four CBS modules (CBS11 module, CBS12 module, CBS13 module, and CBS14 module), three CSP modules (including one CSP1_1 module and two CSP1_3 modules), and one SPP module. "X" in the CSP1_X module denotes a quantity of residual components included in the CSP module.

To improve the feature extraction effect, one attention module may be connected to an output end of each CSP module. To be specific, three attention modules may be included: a CA1 module, a CA2 module, and a CA3 module.

Correspondingly, in a specific process of obtaining the first feature, convolution, batch normalization, and activation processing may be first performed on the initial feature by using the CBS11 module, to obtain a first convolutional feature; then a cross-stage partial fusion operation is performed on the first convolutional feature by using the CSP1_1 module, to obtain a first partially fused feature; and then an attention operation is performed on the first partially fused feature by using the CA1 module, to obtain a first attention-fused feature.

Then convolution, batch normalization, and activation processing are performed on the first attention-fused feature by using the CBS12 module, to obtain a second convolutional feature; then a cross-stage partial fusion operation is performed on the second convolutional feature by using the first CSP1_3 module, to obtain a second partially fused feature; and then an attention operation is performed on the second partially fused feature by using the CA2 module, to obtain a second attention-fused feature.

Subsequently, convolution, batch normalization, and activation processing are performed on the second attention-fused feature by using the CBS13 module, to obtain a third convolutional feature; then a cross-stage partial fusion operation is performed on the third convolutional feature by using the second CSP1_3 module, to obtain a target partially fused feature; and then an attention operation is performed on the target partially fused feature by using the CA3 module, to obtain the first feature.

In a specific process of obtaining the second feature, convolution, batch normalization, and activation processing are performed on the first feature by using the CBS14 module, to obtain a fourth convolutional feature, and then multi-scale feature fusion is performed on the fourth convolutional feature by using the SPP module, to obtain the second feature.

Specifically, the attention module may use the foregoing CBAM attention mechanism or use the CA attention mechanism, to capture both the position information and a long range dependency between channels and improve the feature extraction effect. In FIG. 11, the CA attention mechanism is used as an example for description.

Correspondingly, when the attention operation is performed by using the attention module, the foregoing algorithm principle shown in FIG. 5 may be used to obtain the attention weight in the width direction and the attention weight in the height direction of the input feature map; and then multiplicative weighting calculation is performed based on the obtained attention weights and the feature map to obtain a feature map with the attention weights in the width direction and the height direction.

With continued reference to FIG. 11, the neck network may specifically include five CSP modules (all of which are CSP2_1 modules), four CBS modules (CBS21 module, CBS22 module, CBS23 module, and CBS24 module), two upsampling modules, and four Concat modules.

The CSP2_X module in the neck network is slightly different from the CSP module in the backbone network, and a main difference is that the residual components in the CSP module of the backbone network are replaced with 2×xCBS modules.

The SPP module in the backbone network is connected to a first input end of the first Concat module through the first CSP2_1 module, the CBS21 module, and the first upsampling module; and a second input end of the first Concat module is connected between the second CSP1_3 module and the CBS4 module in the backbone network.

An output end of the first Concat module is connected to a first input end of the second Concat module through the second CSP2_1 module, the CBS22 module, and the second upsampling module; and a second input end of the second Concat module is connected between the first CSP1_3 module and the CBS13 module in the backbone network. An output end of the second Concat module outputs a first-scale feature map to the head prediction network through the third CSP2_1 module.

An output end of the second Concat module is connected to a first input end of the third Concat module through the third CSP2_1 module and the CBS23 module; and a second input end of the third Concat module is connected between the CBS22 module and the second upsampling module. An output end of the third Concat module outputs a second-scale feature map to the head prediction network through the fourth CSP2_1 module.

An output end of the third Concat module is connected to a first input end of the fourth Concat module through the fourth CSP2_1 module and the CBS24 module; and a second input end of the fourth Concat module is connected between the CBS21 and the first upsampling module. An output end of the fourth Concat module outputs a third-scale feature map to the head prediction network through the fifth CSP2_1 module.

In a specific implementation, the second input end of the first Concat module may be connected before or after the CA3 module in the backbone network; and similarly, the second input end of the second Concat module may be connected before or after the CA2 module in the backbone network.

In some embodiments of this application, the second input end of the first Concat module is connected after the CA3 module, and the second input end of the second Concat module is connected after the CA2 module to improve accuracy of the electrode plate detection result.

Correspondingly, obtaining the electrode plate feature based on the second feature may be implemented by the following steps.

First, convolution and upsampling processing are performed on the second feature by using the first CSP2_1 module, the CBS21 module, the first upsampling module, and the first Concat module, followed by feature fusion with the first feature output by the CA3 module, to obtain an intermediate fused feature.

Then convolution and upsampling processing are performed on the intermediate fused feature by using the second CSP2_1 module, the CBS22 module, the second upsampling module, the second Concat module, and the third CSP2_1 module, followed by feature fusion with the second attention-fused feature output by the CA2 module, to generate a first-scale electrode plate feature.

Then feature fusion is performed based on the first-scale electrode plate feature and the intermediate fused feature by using the CBS23 module, the third Concat module, and the fourth CSP2_1 module, to generate a second-scale electrode plate feature.

Finally, feature fusion is performed based on the second-scale electrode plate feature and the second feature by using the CBS24 module, the fourth Concat module, and the fifth CSP2_1 module, to generate a third-scale electrode plate feature.

With continued reference to FIG. 11, the head prediction network may specifically include three detection heads for outputting electrode plate detection results, where each detection head is connected to three output ends of the neck network through one convolution module and configured to receive electrode plate features at different scales, to detect target objects of different sizes based on the electrode plate features at different scales.

The electrode plate detection result output by the head prediction network may include the detected type and position information of each detection box. The type of the detection box may include the anode plate and the cathode plate; and the position information of the detection box may include the coordinates of the central point of the detection box and the width and height of the detection box.

In some embodiments of this application, the foregoing target detection algorithm (such as the YOLO algorithm) may be used to pre-train an electrode plate detection model, then the to-be-detected battery cell electrode plate image is input into the electrode plate detection model, and after feature extraction is performed on the input battery cell electrode plate image by using the electrode plate detection model, electrode plate detection is performed based on the obtained electrode plate feature to obtain the electrode plate detection result.

Figure 12:
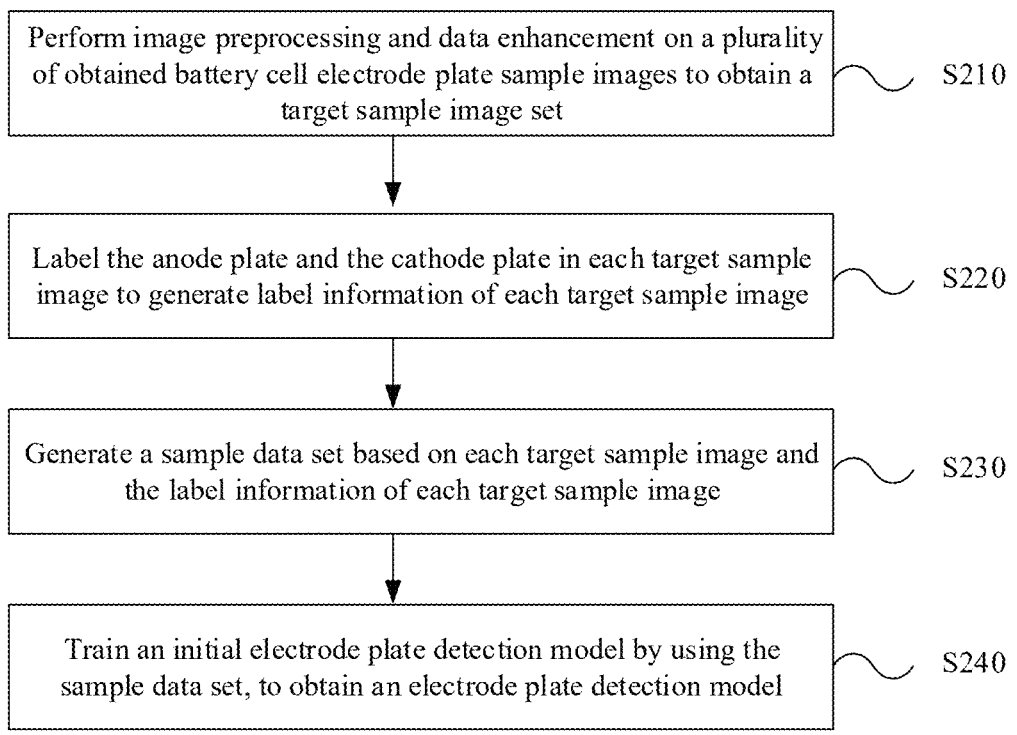
FIG. 12 is a schematic diagram of a method for training an electrode plate detection model according to an embodiment of this application.

The electrode plate detection module may be obtained through training by using the method shown in FIG. 12. As shown in FIG. 12, the method for training the electrode plate detection model may include the following steps.

S210. Perform image preprocessing and data enhancement on a plurality of obtained battery cell electrode plate sample images to obtain a target sample image set, where the target sample image set includes a plurality of target sample images.

Specifically, the battery cell electrode plate sample images may be captured by photographing a plurality of battery cells by using an X-ray device in the manners shown in FIG. 1 and FIG. 3.

For the obtained battery cell electrode plate sample images, image preprocessing may be performed to obtain preprocessed images to enhance definition of the battery cell electrode plate sample images.

The image preprocessing may include filtering, contrast enhancement, and/or other preprocessing operations.

Then data enhancement may be performed on the preprocessed images to obtain target sample images to increase a quantity of samples and enhance a generalization capability of the model.

The data enhancement may include at least one of the following processing: random flipping, scale variation, image translation, noise addition, and the like.

S220. Label the anode plate and the cathode plate in each target sample image to generate label information of each target sample image.

After the target sample image set is obtained, for each target sample image in the target sample image set, a LabelImg tool may be used to label the anode plate and the cathode plate in each target sample image to generate the label information of each target sample image, where the label information may include the types and position information of the electrode plates, and the electrode plates may be represented by labeled detection boxes.

S230. Generate a sample data set based on each target sample image and the label information of each target sample image.

After the label information of each target sample image is generated, each target sample image and its corresponding label information are combined to form a sample, and various samples are combined to form a sample data set.

S240. Train an initial electrode plate detection model by using the sample data set, to obtain the electrode plate detection model.

After the sample data set is generated, the sample data set may be used to train the initial electrode plate detection model to obtain the electrode plate detection model.

The initial electrode plate detection model may use various target detection algorithms described above. YOLOv5s is used as an example for description subsequently.

Specifically, the sample data set may be divided into a training set and a test set, and samples in the training set are input into an initial multi-level feature extraction network model for training, so that a preliminary electrode plate detection model can be established; then the test set and a preset loss function are used to evaluate the established preliminary electrode plate detection model, and network parameters of the electrode plate detection model are modified based on an evaluation result by using an optimizer. The foregoing evaluation steps are repeated until the modified electrode plate detection model meets evaluation requirements. The electrode plate detection model that meets the evaluation requirements is a final established electrode plate detection model.

To increase a training speed, in some embodiments of this application, when the sample data set is used to train the initial electrode plate detection model, the sample data set may be first divided into a training set, a validation set, and a test set; then the initial electrode plate detection model is trained by using the training set, and during the training, hyperparameters are adjusted by using the validation set, until the model converges or reaches the maximum number of training epochs, to obtain the trained initial electrode plate detection model; and finally, after model evaluation is performed on the trained initial electrode plate detection model by using the test set, the electrode plate detection model is generated.

The model includes model parameters and hyperparameters, where the model parameters include internal variables obtained through learning, such as weights, and the hyperparameters include the number of network layers, the number of network nodes, the maximum number of training epochs (epoch), a learning rate, and the like. The training set may be used to adjust the model parameters of the model, and the validation set may be used to adjust the hyperparameters of the model.

During specific training, a set of hyperparameters may be determined first, and then the initial electrode plate detection model is trained by using the training set and validated by using the validation set, and if an effect is poor, the hyperparameters may be adjusted; then the training set is used again for training and then the validation set is used for validation, and if an effect is poor, the hyperparameters continue to be adjusted; and this process is repeated cyclically for a plurality of times until the model converges or reaches the maximum number of training epochs.

A size of the input image may be 1504×1504, initial weights of the model may be randomly initialized, the number of samples in a single batch (batch-size) may be set to 16, the maximum number of training epochs (epoch) may be set to 350, the optimizer may be an adaptive moment estimation (Adam) optimizer, an initial learning rate (lr0) may be set to 0.001, a momentum parameter (momentum) may be 0.937, and a weight decay coefficient (weight_decay) may be 0.0005.

In model evaluation, mean average precision (mean Average Precision, mAP) may be used to evaluate the model, where mAP is a mean value of average precision (Average Precision, AP) of each type, and may be obtained by averaging AP of the anode plate and AP of the cathode plate.

The AP may be determined based on an intersection-over-union (Intersection-over-Union, IoU). The IoU is an overlap rate of a detection box predicted by the model and a detection box in the label information, that is, a ratio of an intersection of the two detection boxes to a union thereof. The larger the value is, the more accurate the position information in the prediction result is.

For a sample, if an IoU corresponding to the sample is greater than or equal to an IoU threshold, a prediction result corresponding to the sample may be considered as correct; otherwise, the prediction result corresponding to the sample may be considered as incorrect. The AP may be determined based on correctness of a prediction result corresponding to each sample in the validation set.

Figure 13:
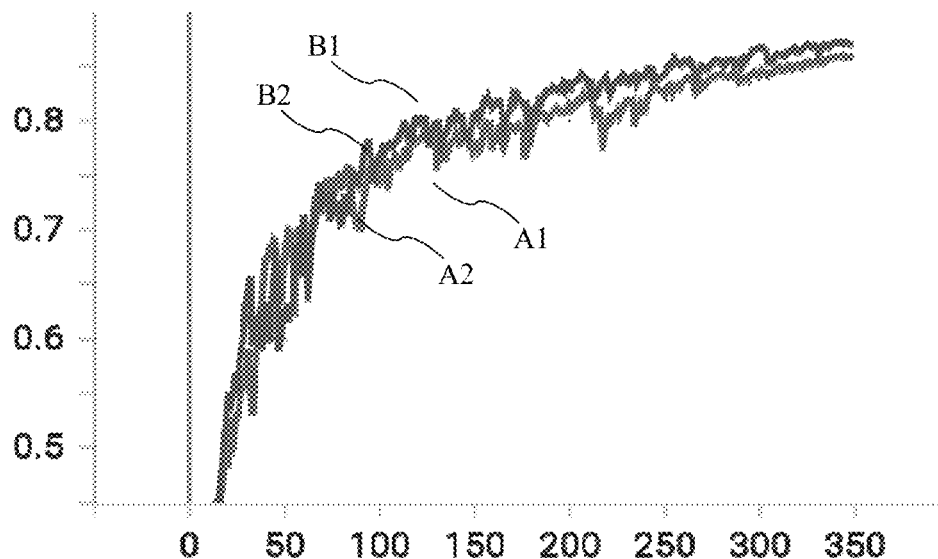
FIG. 13 is a schematic diagram of a mAP change in a model training process according to an embodiment of this application.

FIG. 13 shows variations of mAP at different IoU thresholds (from 0.5 to 0.95 with a step of 0.05) as the number of training epochs increases during the training. The electrode plate detection model is the YOLOv5s model. A curve A1 indicates variations of mAP corresponding to the electrode plate detection model without the CA attention mechanism (hereinafter referred to as a model 1), and a curve A2 indicates a result after the curve A1 is smoothed; and a curve B1 indicates variations of mAP corresponding to the electrode plate detection model after three CA attention modules are added (hereinafter referred to as a model 2), and a curve B2 indicates a result after the curve B1 is smoothed.

As can be learned from FIG. 13, a mAP value of the model 2 is apparently higher than a mAP value of the model 1. In addition, there is a missed detection phenomenon (not shown) in the model 1. An experimental result shows that the electrode plate detection model with the addition of the CA attention mechanism can obtain a more accurate detection result.

In some embodiments of this application, a battery cell electrode plate detection method is provided. The method can implement an electrode plate detection process by using the foregoing electrode plate detection algorithm model shown in FIG. 11. The method may include the following steps.

Step 1. Perform a slicing operation and then a convolution operation on a to-be-detected battery cell electrode plate image by using the focus module, to obtain an initial feature.

Step 2. Perform convolution, batch normalization, and activation processing on the initial feature by using the CBS11 model, to obtain a first convolutional feature.

Step 3. Perform a cross-stage partial fusion operation on the first convolutional feature by using the CSP1_1 module, to obtain a first partially fused feature.

Step 4. Perform an attention operation on the first partially fused feature by using the CA1 module, to obtain a first attention-fused feature.

Step 5. Perform convolution, batch normalization, and activation processing on the first attention-fused feature by using the CBS12 module, to obtain a second convolutional feature.

Step 6. Perform a cross-stage partial fusion operation on the second convolutional feature by using the first CSP1_3 module, to obtain a second partially fused feature.

Step 7. Perform an attention operation on the second partially fused feature by using the CA2 module, to obtain a second attention-fused feature.

Step 8. Perform convolution, batch normalization, and activation processing on the second attention-fused feature by using the CBS13 module, to obtain a third convolutional feature.

Step 9. Perform a cross-stage partial fusion operation on the third convolutional feature by using the second CSP1_3 module, to obtain a target partially fused feature.

Step 10. Perform an attention operation on the target partial feature by using the CA3 module, to obtain a first feature.

Step 11. Perform convolution, batch normalization, and activation processing on the first feature by using the CBS14 module, to obtain a fourth convolutional feature, and then perform multi-scale feature fusion on the fourth convolutional feature by using the SPP module, to obtain a second feature.

Step 12. Perform a cross-stage partial fusion operation on the second feature by using the first CSP2_1 module, to obtain a third partially fused feature, and then perform convolution, batch normalization, and activation processing on the third partially fused feature by using the CBS21 module, to obtain a fifth convolutional feature.

Step 13. Perform upsampling processing on the fifth convolutional feature by using the first upsampling module, and after obtaining a first upsampling result, perform feature fusion on the first upsampling result and the first feature by using the first Concat module, to obtain an intermediate fused feature.

Step 14. Perform a cross-stage partial fusion operation on the intermediate fused feature by using the second CSP2_1 module, to obtain a fourth partially fused feature, and then perform convolution, batch normalization, and activation processing on the fourth partially fused feature by using the CBS22 module, to obtain a sixth convolutional feature.

Step 13. Perform upsampling processing on the sixth convolutional feature by using the second upsampling module, and after obtaining a second upsampling result, perform feature fusion on the second upsampling result and the second attention-fused feature by using the second Concat module, and then perform a cross-stage partial fusion operation on a feature fusion result by using the third CSP2_1 module, to obtain a first-scale electrode plate feature.

Step 14. Perform convolution, batch normalization, and activation processing on the first-scale electrode plate feature by using the CBS23 module, and after obtaining a seventh convolutional feature, perform feature fusion on the seventh convolutional feature and the intermediate fused feature by using the third Concat module, and then perform a cross-stage partial fusion operation on a feature fusion result by using the fourth CSP2_1 module, to obtain a second-scale electrode plate feature.

Step 15. Perform convolution, batch normalization, and activation processing on the second-scale electrode plate feature by using the CBS24 module, and after obtaining an eighth convolutional feature, perform feature fusion on the eighth convolutional feature and the fifth convolutional feature by using the fourth Concat module, and then perform a cross-stage partial fusion operation on a feature fusion result by using the fifth CSP2_1 module, to obtain a third-scale electrode plate feature.

Step 16. Perform electrode plate detection based on the first-scale electrode plate feature, the second-scale electrode plate feature, and the third-scale electrode plate feature to obtain an electrode plate detection result.

Step 17. Determine an amount of misalignment between an anode plate and a cathode plate based on position information of the anode plate and the cathode plate in the electrode plate detection result.

Step 18. Detect, based on the determined amount of misalignment between the anode plate and the cathode plate, whether a target battery cell is qualified.

For a specific implementation process of the foregoing steps, refer to the corresponding descriptions in the foregoing embodiments. Details are not described herein.

A person skilled in the art may understand that the foregoing embodiments are exemplary and are not intended to limit this application. In possible cases, an execution sequence of one or more of the foregoing steps may be adjusted, or the steps may be selectively combined, to obtain one or more other embodiments. A person skilled in the art may selectively combine any of the foregoing steps as required, without departing from the essence of the solution of this application, and all such combinations shall fall within the protection scope of this application.

Based on a same inventive concept, as an implementation of the foregoing method, an embodiment of this application provides a battery cell electrode plate detection apparatus. The apparatus embodiment corresponds to the foregoing method embodiment. For ease of reading, details in the foregoing method embodiment are not described in the apparatus embodiment. However, it should be clear that the apparatus in this embodiment can correspondingly implement all content of the foregoing method embodiment.

Figure 14:
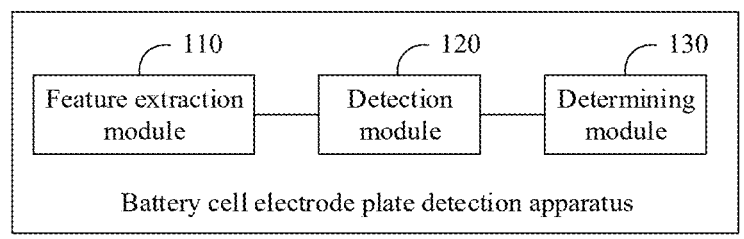
FIG. 14 is a schematic structural diagram of a battery cell electrode plate detection apparatus according to an embodiment of this application.

FIG. 14 is a schematic structural diagram of a battery cell electrode plate detection apparatus according to an embodiment of this application. As shown in FIG. 14, the apparatus provided in this embodiment includes:
- a feature extraction module 110, configured to perform feature extraction on a to-be-detected battery cell electrode plate image to obtain an electrode plate feature, where the electrode plate feature includes a channel attention feature embedded with position information;
- a detection module 120, configured to perform electrode plate detection based on the electrode plate feature to obtain an electrode plate detection result, where the electrode plate detection result includes position information of an anode plate and a cathode plate; and
- a determining module 130, configured to determine an amount of misalignment between the anode plate and the cathode plate based on the position information of the anode plate and the cathode plate in the electrode plate detection result.

Optionally, the performing feature extraction on a to-be-detected battery cell electrode plate image to obtain an electrode plate feature includes:
- performing a plurality of convolution operations and at least one attention operation on the to-be-detected battery cell electrode plate image to obtain a first feature;
- performing multi-scale feature fusion on the first feature to obtain a second feature; and
- performing feature fusion from deep to shallow and then from shallow to deep on the second feature to obtain the electrode plate feature.

Optionally, the performing a plurality of convolution operations and at least one attention operation on the to-be-detected battery cell electrode plate image to obtain a first feature includes:
- performing a slicing operation and then a convolution operation on the to-be-detected battery cell electrode plate image to obtain an initial feature;
- performing a plurality of convolution, batch normalization, activation, and cross-stage partial fusion operations on the initial feature to obtain a target partial feature; and
- performing an attention operation on the target partial feature to obtain the first feature.

Optionally, the performing a plurality of convolution, batch normalization, activation, and cross-stage partial fusion operations on the initial feature to obtain a target partial feature includes:
- performing convolution, batch normalization, and activation processing on the initial feature to obtain a first convolutional feature;
- performing a cross-stage partial fusion operation on the first convolutional feature to obtain a first partially fused feature;
- performing an attention operation on the first partially fused feature to obtain a first attention-fused feature;
- performing convolution, batch normalization, and activation processing on the first attention-fused feature to obtain a second convolutional feature;
- performing a cross-stage partial fusion operation on the second convolutional feature to obtain a second partially fused feature;
- performing an attention operation on the second partially fused feature to obtain a second attention-fused feature;
- performing convolution, batch normalization, and activation processing on the second attention-fused feature to obtain a third convolutional feature; and
- performing a cross-stage partial fusion operation on the third convolutional feature to obtain a target partially fused feature.

Optionally, the performing feature fusion from deep to shallow and then from shallow to deep on the second feature to obtain the electrode plate feature includes:
- performing convolution and upsampling processing on the second feature, followed by feature fusion with the first feature, to obtain an intermediate fused feature;
- performing convolution and upsampling processing on the intermediate fused feature, followed by feature fusion with the second attention-fused feature, to generate a first-scale electrode plate feature;
- performing feature fusion based on the first-scale electrode plate feature and the intermediate fused feature to generate a second-scale electrode plate feature; and
- performing feature fusion based on the second-scale electrode plate feature and the second feature to generate a third-scale electrode plate feature.

Optionally, the attention operation includes:
- obtaining an attention weight in a width direction and an attention weight in a height direction of an input feature map; and
- performing multiplicative weighting calculation based on the obtained attention weights and the feature map to obtain a feature map with the attention weights in the width direction and the height direction.

Optionally, the position information includes coordinates of a central point of a detection box and a width and height of the detection box; and
the determining an amount of misalignment between the anode plate and the cathode plate based on the position information of the anode plate and the cathode plate in the electrode plate detection result includes:
- determining coordinates of a target vertex of each anode plate based on coordinates of a central point of a detection box of each anode plate and a width and height of the detection box of each anode plate in the electrode plate detection result;
- determining coordinates of a target vertex of each cathode plate based on coordinates of a central point of a detection box of each cathode plate and a width and height of the detection box of each cathode plate in the electrode plate detection result; and determining, based on the coordinates of the target vertex of each anode plate and the coordinates of the target vertex of each cathode plate, an amount of misalignment between the anode plate and the cathode plate.

Optionally, the determining, based on the coordinates of the target vertex of each anode plate and the coordinates of the target vertex of each cathode plate, an amount of misalignment between the anode plate and the cathode plate includes:

determining a position relationship between each anode plate and each cathode plate in a horizontal coordinate direction based on a horizontal coordinate of the coordinates of the target vertex of each anode plate and a horizontal coordinate of the coordinates of the target vertex of each cathode plate; and for each cathode plate, determining, based on a vertical coordinate of the coordinates of the target vertex of the cathode plate and vertical coordinates of coordinates of target vertices of two anode plates adjacent to the cathode plate, an amount of misalignment between the cathode plate and each of the two adjacent anode plates.

Optionally, the battery cell electrode plate image is obtained by photographing an edge region of a target battery cell, and the amount of misalignment between the anode plate and cathode plate is determined based on electrode plate detection results corresponding to a plurality of battery cell electrode plate images; and the detection module 120 is further configured to detect, based on a determined amount of misalignment between an anode plate and a cathode plate, whether the target battery cell is qualified.

Optionally, the determined amount of misalignment between the anode plate and the cathode plate includes an amount of misalignment between each cathode plate and each of two adjacent anode plates in each electrode plate detection result; and the detecting, based on a determined amount of misalignment between an anode plate and a cathode plate, whether the target battery cell is qualified includes: if there is an amount of misalignment less than or equal to a first threshold among the determined amounts of misalignment corresponding to each cathode plate, determining that the target battery cell is unqualified.

Optionally, the detection module is further configured to: if there is an amount of misalignment greater than or equal to a second threshold among the determined amounts of misalignment corresponding to each cathode plate, determine that the target battery cell is unqualified; or if the determined amounts of misalignment corresponding to each cathode plate are all greater than the first threshold and less than the second threshold, determine that the target battery cell is qualified.

Optionally, the electrode plate detection result is obtained by using an electrode plate detection model, where the electrode plate detection model is used to perform electrode plate detection based on the obtained electrode plate feature after feature extraction is performed on the battery cell electrode plate image, and output the electrode plate detection result; and the electrode plate detection model is obtained through training by using the following training method:

performing image preprocessing and data enhancement on a plurality of obtained battery cell electrode plate sample images to obtain a target sample image set, where the target sample image set includes a plurality of target sample images;

labeling the anode plate and the cathode plate in each target sample image to generate label information of each target sample image, where the label information includes types and position information of the electrode plates;

generating a sample data set based on each target sample image and the label information of each target sample image; and training an initial electrode plate detection model by using the sample data set, to obtain the electrode plate detection model.

Optionally, the image preprocessing includes filtering and/or contrast enhancement.

Optionally, the data enhancement includes at least one of the following: random flipping, scale variation, image translation, and noise addition.

Optionally, the training an initial electrode plate detection model by using the sample data set, to obtain the electrode plate detection model includes:

dividing the sample data set into a training set, a validation set, and a test set;

training the initial electrode plate detection model by using the training set, and during the training, adjusting hyperparameters by using the validation set, until the model converges or reaches the maximum number of training epochs, to obtain the trained initial electrode plate detection model; and after performing model evaluation on the trained initial electrode plate detection model by using the test set, generating the electrode plate detection model.

The battery cell electrode plate detection apparatus provided in this embodiment can perform the foregoing method embodiment. Implementation principles and technical effects thereof are similar and are not described herein again.

A person skilled in the art may clearly realize that, for ease and brevity of description, only division into the foregoing functional units or modules is used as an example for description. In an actual application, the foregoing functions may be allocated, depending on a requirement, to different functional units or modules for implementation, that is, an internal structure of the apparatus is divided into different functional units or modules to implement all or part of the functions described above. The functional units or modules in this embodiment may be integrated into one processing unit, or each of the units may exist alone physically, or two or more units are integrated into one unit. The integrated unit may be implemented in a form of hardware, or may be implemented in a form of a software functional unit. In addition, specific names of the functional units or modules are merely used to distinguish each other, and are not used to limit the protection scope of this application. For detailed working processes of the units or modules in the foregoing system, refer to the corresponding processes in the foregoing method embodiment. Details are not described herein again.

Figure 15:
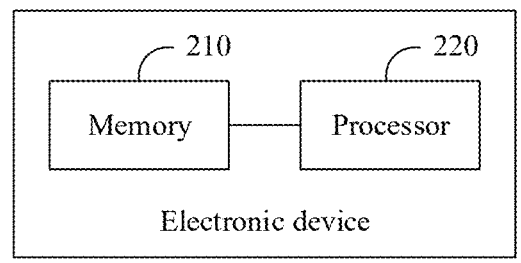
FIG. 15 is a schematic structural diagram of an electronic device according to an embodiment of this application.

Based on the same inventive concept, an embodiment of this application further provides an electronic device. FIG. 15 is a schematic structural diagram of an electronic device according to an embodiment of this application. As shown in FIG. 15, the electronic device provided in this embodiment includes a memory 210 and a processor 220. The memory 210 is configured to store a computer program. The processor 220 is configured to perform the method in the foregoing method embodiment when the computer program is invoked.

The electronic device provided in this embodiment can perform the foregoing method embodiment. Implementation principles and technical effects thereof are similar and are not described herein again.

An embodiment of this application further provides a computer-readable storage medium. The computer-readable storage medium stores a computer program, and when the computer program is executed by a processor, the method in the foregoing method embodiment is implemented.

An embodiment of this application further provides a computer program product. When the computer program product runs on an electronic device, the electronic device is enabled to perform the method in the foregoing method embodiment.

An embodiment of this application further provides a system-on-chip, including a processor. The processor is coupled to a memory, and the processor executes a computer program stored in the memory, to implement the method in the foregoing method embodiment. The system-on-chip may be a single chip or a chip module including a plurality of chips.

All or part of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or transmitted through the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person of ordinary skill in the art may understand that all or part of the processes of the methods in the foregoing embodiments may be implemented by a computer program instructing relevant hardware. The program may be stored in a computer-readable storage medium. When the program is executed, the processes of the methods in the foregoing embodiments may be performed. The storage medium may include any medium that can store program code, such as a ROM, a random access memory RAM, a magnetic disk, or an optical disc.

In the foregoing embodiments, each embodiment has its focus. For parts not detailed or described in an embodiment, reference can be made to related descriptions of another embodiment.

Finally, it should be noted that the foregoing embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application.

What is claimed is:

1. A battery cell electrode plate detection method, comprising:
   performing feature extraction on a to-be-detected battery cell electrode plate image to obtain an electrode plate feature, wherein the electrode plate feature comprises a channel attention feature embedded with position information;
   performing electrode plate detection based on the electrode plate feature to obtain an electrode plate detection result, wherein the electrode plate detection result comprises position information of an anode plate and a cathode plate; and
   determining an amount of misalignment between the anode plate and the cathode plate based on the position information of the anode plate and the cathode plate in the electrode plate detection result;
   wherein the performing feature extraction on a to-be-detected battery cell electrode plate image to obtain an electrode plate feature comprises:
   performing a plurality of convolution operations and at least one attention operation on the to-be-detected battery cell electrode plate image to obtain a first feature;
   performing multi-scale feature fusion on the first feature to obtain a second feature; and
   performing feature fusion from deep to shallow and then from shallow to deep on the second feature to obtain the electrode plate feature;
   wherein the performing a plurality of convolution operations and at least one attention operation on the to-be-detected battery cell electrode plate image to obtain a first feature comprises:
   performing a slicing operation and then a convolution operation on the to-be-detected battery cell electrode plate image to obtain an initial feature:
   performing a plurality of convolution, batch normalization, activation, and cross-stage partial fusion operations on the initial feature to obtain a target partial feature; and
   performing an attention operation on the target partial feature to obtain the first feature; and
   wherein the performing a plurality of convolution, batch normalization, activation, and cross-stage partial fusion operations on the initial feature to obtain a target partial feature comprises:
   performing convolution, batch normalization, and activation processing on the initial feature to obtain a first convolutional feature;
   performing a cross-stage partial fusion operation on the first convolutional feature to obtain a first partially fused feature;
   performing an attention operation on the first partially fused feature to obtain a first attention-fused feature;
   performing convolution, batch normalization, and activation processing on the first attention-fused feature to obtain a second convolutional feature;
   performing a cross-stage partial fusion operation on the second convolutional feature to obtain a second partially fused feature;
   performing an attention operation on the second partially fused feature to obtain a second attention-fused feature;

performing convolution, batch normalization, and activation processing on the second attention-fused feature to obtain a third convolutional feature; and performing a cross-stage partial fusion operation on the third convolutional feature to obtain a target partially fused feature;

optionally the performing feature fusion from deep to shallow and then from shallow to deep on the second feature to obtain the electrode plate feature comprises:

performing convolution and upsampling processing on the second feature, followed by feature fusion with the first feature, to obtain an intermediate fused feature;

performing convolution and upsampling processing on the intermediate fused feature, followed by feature fusion with the second attention-fused feature, to generate a first-scale electrode plate feature;

performing feature fusion based on the first-scale electrode plate feature and the intermediate fused feature to generate a second-scale electrode plate feature, and performing feature fusion based on the second-scale electrode plate feature and the second feature to generate a third-scale electrode plate feature.

2. The method according to claim 1, wherein the attention operation comprises: obtaining an attention weight in a width direction and an attention weight in a height direction of an input feature map; and performing multiplicative weighting calculation based on the obtained attention weights and the feature map to obtain a feature map with the attention weights in the width direction and the height direction.

3. The method according to claim 1, wherein the position information comprises coordinates of a central point of a detection box and a width and height of the detection box; and the determining an amount of misalignment between the anode plate and the cathode plate based on the position information of the anode plate and the cathode plate in the electrode plate detection result comprises:

determining coordinates of a target vertex of each anode plate based on coordinates of a central point of a detection box of each anode plate and a width and height of the detection box of each anode plate in the electrode plate detection result;

determining coordinates of a target vertex of each cathode plate based on coordinates of a central point of a detection box of each cathode plate and a width and height of the detection box of each cathode plate in the electrode plate detection result; and determining, based on the coordinates of the target vertex of each anode plate and the coordinates of the target vertex of each cathode plate, the amount of misalignment between the anode plate and the cathode plate.

4. The method according to claim 3, wherein the determining, based on the coordinates of the target vertex of each anode plate and the coordinates of the target vertex of each cathode plate, the amount of misalignment between the anode plate and the cathode plate comprises:

determining a position relationship between each anode plate and each cathode plate in a horizontal coordinate direction based on a horizontal coordinate of the coordinates of the target vertex of each anode plate and a horizontal coordinate of the coordinates of the target vertex of each cathode plate; and for each cathode plate, determining, based on a vertical coordinate of the coordinates of the target vertex of the cathode plate and vertical coordinates of coordinates of target vertices of two anode plates adjacent to the cathode plate, an amount of misalignment between the cathode plate and each of the two adjacent anode plates.

5. The method according to claim 1, wherein the battery cell electrode plate image is obtained by photographing an edge region of a target battery cell, and the amount of misalignment between the anode plate and cathode plate is determined based on electrode plate detection results corresponding to a plurality of battery cell electrode plate images; and the method further comprises:

detecting, based on a determined amount of misalignment between an anode plate and a cathode plate, whether the target battery cell is qualified, optionally the determined amount of misalignment between the anode plate and the cathode plate comprises an amount of misalignment between each cathode plate and each of two adjacent anode plates in each electrode plate detection result; and the detecting, based on a determined amount of misalignment between an anode plate and a cathode plate, whether the target battery cell is qualified comprises:

if there is an amount of misalignment less than or equal to a first threshold among the determined amounts of misalignment corresponding to each cathode plate, determining that the target battery cell is unqualified, and the method further comprises:

if there is an amount of misalignment greater than or equal to a second threshold among the determined amounts of misalignment corresponding to each cathode plate, determining that the target battery cell is unqualified; or if the determined amounts of misalignment corresponding to each cathode plate are all greater than the first threshold and less than the second threshold, determining that the target battery cell is qualified.

6. The method according to claim 1, wherein the electrode plate detection result is obtained by using an electrode plate detection model, wherein the electrode plate detection model is used to perform electrode plate detection based on the obtained electrode plate feature after feature extraction is performed on the battery cell electrode plate image, and output the electrode plate detection result; and the electrode plate detection model is obtained through training by using the following training method:

performing image preprocessing and data enhancement on a plurality of obtained battery cell electrode plate sample images to obtain a target sample image set, wherein the target sample image set comprises a plurality of target sample images;

labeling the anode plate and the cathode plate in each target sample image to generate label information of each target sample image, wherein the label information comprises types and position information of the electrode plates;

generating a sample data set based on each target sample image and the label information of each target sample image; and training an initial electrode plate detection model by using the sample data set, to obtain the electrode plate detection model.

7. The method according to claim 6, wherein the image preprocessing comprises filtering and/or contrast enhancement.

8. The method according to claim 6, wherein the data enhancement comprises at least one of the following: random flipping, scale variation, image translation, and noise addition.

9. The method according to claim 6, wherein the training an initial electrode plate detection model by using the sample data set, to obtain the electrode plate detection model comprises:
- dividing the sample data set into a training set, a validation set, and a test set:
- training the initial electrode plate detection model by using the training set, and during the training, adjusting hyperparameters by using the validation set, until the model converges or reaches the maximum number of training epochs, to obtain the trained initial electrode plate detection model; and
- after performing model evaluation on the trained initial electrode plate detection model by using the test set, generating the electrode plate detection model.

10. A battery cell electrode plate detection apparatus, comprising means configured to perform the method according to claim 1, comprising:
- a feature extraction module, configured to perform feature extraction on a to-be-detected battery cell electrode plate image to obtain an electrode plate feature, wherein the electrode plate feature comprises a channel attention feature embedded with position information;
- a detection module, configured to perform electrode plate detection based on the electrode plate feature to obtain an electrode plate detection result, wherein the electrode plate detection result comprises position information of an anode plate and a cathode plate; and
- a determining module, configured to determine an amount of misalignment between the anode plate and the cathode plate based on the position information of the anode plate and the cathode plate in the electrode plate detection result.

11. An electronic device, comprising a memory and a processor, wherein the memory is configured to store a computer program: and the processor is configured to perform the method according to claim 1 when the computer program is invoked.

12. A not-transitory computer-readable storage medium, wherein the non-transitory computer-readable storage medium stores a computer program, and when the computer program is executed by a processor, the method according to claim 1 is implemented.

* * * * *